(12) United States Patent
Pollack et al.

(10) Patent No.: US 8,460,528 B2
(45) Date of Patent: Jun. 11, 2013

(54) REAGENT STORAGE AND RECONSTITUTION FOR A DROPLET ACTUATOR

(75) Inventors: Michael G. Pollack, Durham, NC (US);
Alexander Shenderov, Raleigh, NC (US); Philip Paik, Chula Vista, CA (US); Vijay Srinivasan, Durham, NC (US); Vamsee K. Pamula, Durham, NC (US)

(73) Assignee: Advanced Liquid Logic Inc., Research Triangle Park, NC (US)

( * ) Notice: Subject to any disclaimer, the term of this patent is extended or adjusted under 35 U.S.C. 154(b) by 273 days.

(21) Appl. No.: 12/681,879

(22) PCT Filed: Oct. 14, 2008

(86) PCT No.: PCT/US2008/079812
§ 371 (c)(1),
(2), (4) Date: Jul. 21, 2010

(87) PCT Pub. No.: WO2009/052095
PCT Pub. Date: Apr. 23, 2009

(65) Prior Publication Data
US 2010/0282609 A1  Nov. 11, 2010

Related U.S. Application Data

(60) Provisional application No. 60/980,622, filed on Oct. 17, 2007.

(51) Int. Cl.
*G01N 27/26* (2006.01)

(52) U.S. Cl.
USPC ....... 204/450; 204/600; 422/68.1; 435/287.1; 435/287.2; 435/4

(58) Field of Classification Search
USPC .................................................. 204/450, 600
See application file for complete search history.

(56) References Cited

U.S. PATENT DOCUMENTS

| 5,245,734 A | 9/1993 | Issartel |
| 5,935,858 A * | 8/1999 | Herst .............................. 436/45 |

(Continued)

FOREIGN PATENT DOCUMENTS

| JP | 2003112031 A | | 4/2003 |
| WO | WO 2006/003292 | * | 1/2006 |

(Continued)

OTHER PUBLICATIONS

Sato et al. (Anal. Chem. 2000, 72, 1144-1147).*

(Continued)

*Primary Examiner* — J. Christopher Ball
*Assistant Examiner* — Jennifer Dieterle
(74) *Attorney, Agent, or Firm* — William A. Barrett; Ward and Smith, P.A.

(57) ABSTRACT

On-board reagent storage, handling, and dispensing apparatuses and methods for droplet actuator systems are provided. In one embodiment, a fluidic analyzer is provided and includes a droplet actuator including a substrate including a plurality of electrodes configured to actuate a droplet and a reagent storage component in selective fluid communication with the droplet actuator and including a reagent configured to combine with a solvent at a time of use. In another embodiment, a method of conducting fluidic analysis is provided and includes storing a reagent within a reagent storage component in fluid communication with a droplet actuator including a plurality of electrodes configured to actuate a droplet and combining the reagent with a solvent at a time for use within the droplet actuator.

32 Claims, 13 Drawing Sheets

U.S. PATENT DOCUMENTS

| | | | |
|---|---|---|---|
| 6,565,727 B1 | 5/2003 | Shenderov | |
| 6,773,566 B2 | 8/2004 | Shenderov | |
| 6,911,132 B2 | 6/2005 | Pamula et al. | |
| 6,977,033 B2 | 12/2005 | Becker et al. | |
| 7,052,244 B2 | 5/2006 | Fouillet et al. | |
| 7,163,612 B2 | 1/2007 | Sterling et al. | |
| 7,255,780 B2 | 8/2007 | Shenderov | |
| 7,328,979 B2 | 2/2008 | Decre et al. | |
| 7,439,014 B2 | 10/2008 | Pamula et al. | |
| 7,458,661 B2 | 12/2008 | Kim et al. | |
| 7,547,380 B2 | 6/2009 | Velev | |
| 7,641,779 B2 | 1/2010 | Becker et al. | |
| 7,727,466 B2 | 6/2010 | Meathrel et al. | |
| 7,901,947 B2 | 3/2011 | Pollack et al. | |
| 7,943,030 B2 | 5/2011 | Shenderov | |
| 8,093,064 B2 | 1/2012 | Shah et al. | |
| 2002/0046948 A1* | 4/2002 | Chow et al. | 204/450 |
| 2003/0006140 A1* | 1/2003 | Vacca et al. | 204/601 |
| 2004/0055891 A1 | 3/2004 | Pamula et al. | |
| 2004/0161788 A1 | 8/2004 | Chen et al. | |
| 2005/0056713 A1* | 3/2005 | Tisone et al. | 239/690 |
| 2005/0237699 A1* | 10/2005 | Carroll | 361/600 |
| 2006/0054503 A1* | 3/2006 | Pamula et al. | 204/450 |
| 2006/0194331 A1* | 8/2006 | Pamula et al. | 436/150 |
| 2006/0231398 A1* | 10/2006 | Sarrut et al. | 204/450 |
| 2006/0254933 A1* | 11/2006 | Adachi et al. | 205/777 |
| 2007/0023292 A1 | 2/2007 | Kim et al. | |
| 2007/0039866 A1* | 2/2007 | Schroeder et al. | 210/265 |
| 2007/0064990 A1 | 3/2007 | Roth | |
| 2007/0117959 A1 | 5/2007 | Shastri | |
| 2007/0207513 A1 | 9/2007 | Sorensen et al. | |
| 2008/0098917 A1 | 5/2008 | Rikihisa et al. | |
| 2008/0124252 A1 | 5/2008 | Marchand et al. | |
| 2008/0151240 A1 | 6/2008 | Roth | |
| 2008/0156983 A1* | 7/2008 | Fourrier et al. | 250/288 |
| 2008/0185296 A1* | 8/2008 | Sauter-Starace et al. | 205/777.5 |
| 2008/0274513 A1 | 11/2008 | Shenderov | |
| 2008/0283414 A1 | 11/2008 | Monroe et al. | |
| 2008/0305481 A1 | 12/2008 | Whitman et al. | |
| 2009/0192044 A1 | 7/2009 | Fouillet et al. | |
| 2009/0321262 A1 | 12/2009 | Adachi et al. | |
| 2010/0096266 A1 | 4/2010 | Kim et al. | |
| 2011/0118132 A1 | 5/2011 | Winger et al. | |
| 2011/0209998 A1 | 9/2011 | Shenderov | |
| 2012/0132528 A1 | 5/2012 | Shenderov | |

FOREIGN PATENT DOCUMENTS

| | | | |
|---|---|---|---|
| WO | WO 2006/056787 | * | 6/2006 |
| WO | WO 2006/124458 | | 11/2006 |
| WO | WO 2006/131679 | * | 12/2006 |
| WO | 2007120241 | | 10/2007 |
| WO | 2008098236 | | 8/2008 |
| WO | 2008101194 | | 8/2008 |
| WO | 2008134153 | | 11/2008 |
| WO | 2009003184 | | 12/2008 |
| WO | 2009021173 | | 2/2009 |
| WO | 2010027894 | | 3/2010 |

OTHER PUBLICATIONS

Sista (Development of a digital microfluidic lab-on-a-chip for automated immunoassay with magnetically responsive beads, Proc. AIChE Annual Meeting, Mar. 2007).*

Boles et al., "Droplet-Based Pyrosequencing Using Digital Microfluidics," Analytical Chemistry, vol. 83, pp. 8439-8447, Sep. 2011.

Dewey et al, "Towards a Visual Modeling Approach to Designing Microelectromechanical System Transducers," Journal of Micromechanics and Microengineering, vol. 9, pp. 332-340, Dec. 1999.

Dewey et al., "Visual Modeling and Design of Microelectromechanical System Transducers," Microelectronics Journal, vol. 32, pp. 373-381, Apr. 2001.

Fair et al., "A Microwatt Metal Insulator Solution Transport (MIST) Device for Scalable Digital Biomicrofluidic Systems," IEEE IEDM Technical Digest, pp. 16.4.1-16.4.4, 2001.

Fair et al., "Electrowetting-Based On-Chip Sample Processing for Integrated Microfluidics," IEEE Int'l Electron Devices Meeting (IEDM), 2003.

Fair et al., "Integrated Chemical/Biochemical Sample Collection, Pre-Concentration, and Analysis on a Digital Microfluidic Lab-on-a-Chip Platform," Lab-on-a-Chip: Platforms, Devices, and Applications, Conf. 5591, SPIE Optics East, Philadelphia, Oct. 25-28, 2004.

Fair et al., "Bead-Based and Solution-Based Assays Performed on a Digital Microfluidic Platform," Biomedical Engineering Society (BMES) Fall Meeting, Baltimore, MD, Oct. 1, 2005.

Fair et al., "Chemical and Biological Applications of Digital Microfluidic Devices," IEEE Design and Test of Computers, vol. 24(1): pp. 10-24, Jan.-Feb. 2007.

Hua et al, "Multiplexed Real-Time Polymerase Chain Reaction on a Digital Microfluidic Platform," Analytical Chemistry, vol. 82, pp. 2310-2316, Mar. 2010.

Kleinert et al., "Dynamics and Stability of Oil Films During Droplet Transport by Electrowetting," 86th ACS Colloid & Surface Science Symposium, Jun. 13, 2012.

Millington et al., "Digital Microfluidics: A Future Technology in the Newborn Screening Laboratory?," Seminars in Perinatology, vol. 34, pp. 163-169, Apr. 2010.

Paik et al., "Rapid Droplet Mixers for Digital Microfluidic Systems," Lab on a Chip, vol. 3, pp. 253-259, 2003. (More mixing videos available, along with the article, at LOC's website.).

Paik et al., "Electrowetting-Based Droplet Mixers for Microfluidic Systems," Lab on a Chip (LOC), vol. 3, pp. 28-33, 2003 (more mixing videos available, along with the article, at LOC's website).

Paik et al., "Thermal Effects on Droplet Transport in Digital Microfluidics with Applications to Chip Cooling Processing for Integrated Microfluidics," Int'l Conf. On Thermal, Mechanics, and Thermomechanical Phenomena in Electronic Systems (ITherm), pp. 649-654, 2004.

Paik et al, "Coplanar Digital Microfluidics Using Standard Printed Circuit Board Processes," 9th Int'l Conf. on Miniaturized Systems for Chemistry and Life Sciences, Boston, MA, pp. 566-568, Oct. 9-13, 2005.

Paik et al, "Droplet-Based Hot Spot Cooling Using Topless Digital Microfluidics on a Printed Circuit Board," Int'l Workshops on Thermal Investigations of ICs and Systems (THERMINIC), pp. 278-283, 2005.

Paik et al, "Adaptive Hot-Spot Cooling of Integrated Circuits Using Digital Microfluidics ," ASME Int'l Mechanical Engineering Congress and Exposition (IMECE), Nov. 5-11, 2005.

Paik et al., "Programmable Flow-Through Real-Time PCR Using Digital Microfluidics," 11th Int'l Conf. on Miniaturized Systems for Chemistry and Life Sciences, Paris, France, pp. 1559-1561, Oct. 7-11, 2007.

Paik et al, "Adaptive Cooling of Integrated Circuits Using Digital Microfluidics," accepted for publication in IEEE Transactions on VLSI Systems, 2007, and Artech House, Norwood, MA, 2007.

Paik et al, "A Digital-Microfluidic Approach to Chip Cooling," IEEE Design & Test of Computers, vol. 25, pp. 372-381, Jul. 2008.

Pamula et al., "Microfluidic Electrowetting-Based Droplet Mixing," Proceedings, MEMS Conf. Berkeley, pp. 8-10, Aug. 2001.

Pamula et al., "Cooling of Integrated Circuits Using Droplet-Based Microfluidics," Proc. ACM Great Lakes Symposium on VLSI, pp. 84-87, 2003.

Pamula et al., "A Droplet-Based Lab-on-a-Chip for Colorimetric Detection of Nitroaromatic Explosives," Proceedings of Micro Electro Mechanical Systems, pp. 722-725, 2005.

Pollack et al., "Electrowetting-Based Actuation of Liquid Droplets for Microfluidic Applications," Applied Physics Letters, vol. 77, No. 11, pp. 1725-1726, Sept. 11, 2000.

Pollack, M.G., "Electrowetting-Based Microactuation of Droplets for Digital Microfluidics," Ph.D. Thesis, Department of Electrical and Computer Engineering, Duke University, 2001.

Pollack et al., "Electrowetting-Based Microfluidics for High-Throughput Screening," SmallTalk 2001 Conf. Program Abstract, p. 149, San Diego, Aug. 2001.

Pollack et al., "Electrowetting-Based Actuation of Droplets for Integrated Microfluidics," Lab on a Chip (LOC), vol. 2, pp. 96-101, 2002.

Pollack et al., "Investigation of Electrowetting-Based Microfluidics for Real-Time PCR Applications," 7th Int'l Conf. on Micro Total Analysis Systems (µTAS), 2003.

Pollack et al., "Applications of Electrowetting-Based Digital Microfluidics in Clinical Diagnostics," Expert Rev. Mol. Diagn., vol. 11(4), pp. 393-407, 2011.

Punnamaraju et al., "Voltage Control of Droplet Interface Bilayer Lipid Membrane Dimensions," Langmuir the Acs Journal of Surfaces and Colloids, vol. 27, Issue 2, pp. 618-626, 2011.

Punnamaraju, S., "Voltage and Photo Induced Effects in Droplet-Interface-Bilayer Lipid Membranes," PhD Thesis, University of Cincinnati, 2011.

Ren et al., "Dynamics of Electro-Wetting Droplet Transport," Sensors and Actuators B (Chemical), vol. B87, No. 1, 201-6, 2002.

Ren et al., "Micro/Nano Liter Droplet Formation and Dispensing by Capacitance Metering and Electrowetting Actuation," IEEE-NANO, pp. 369-372, 2002.

Ren et al., "Automated Electrowetting-Based Droplet Dispensing with Good Reproducibility," Proc. Micro Total Analysis Systems (µTAS), pp. 993-996, 2003.

Ren, H., R.B. Fair, M.G. Pollack "Automated On-Chip Droplet Dispensing with Volume Control by Electro-Wetting Actuation and Capacitance Metering," Sensors and Actuators B, 98, pp. 319-327, 2004.

Schell et al., "Evaluation of a Digital Microfluidic real-time PCR Platform to detect DNA of *Candida albicans* in Blood," J. Clin Microbiol Infect Dis, Published on-line DOI 10.1007/s10096-012-15616, Feb. 2012.

Sista, R., "Development of a Digital Microfluidic Lab-on-a-Chip for Automated Immunoassay with Magnetically Responsive Beads," Ph.D. Thesis, Dep't of Chemical Engineering, Florida State University, 2007.

Sista et al., "Development of a Digital Microfluidic Platform for Point of Care Testing," Lab on a Chip, vol. 8, pp. 2091-2104, Dec. 2008.

Sista et al., "Heterogeneous Immunoassays Using Magnetic Beads on a Digital Microfluidic Platform," Lab on a Chip, vol. 8, pp. 2188-2196, Dec. 2008.

Sista et al., "Digital Microfluidic Platform for Multiplexing Enzyme Assays: Implications for Lysosomal Storage Disease Screening in Newborns," Clinical Chemistry, vol. 57, pp. 1444-1451, 2011.

Sista et al., "Rapid, Single-Step Assay for Hunter Syndrome in Dried Blood Spots Using Digital Microfluidics," Clinica Chimica Acta, vol. 412, pp. 1895-1897, 2011.

Srinivasan et al., "Scalable Macromodels for Microelectromechanical Systems," Technical Proc. 2001 Int'l Conf. on Modeling and Simulation of Microsystems, pp. 72-75, 2001.

Srinivasan et al., "A Digital Microfluidic Biosensor for Multianalyte Detection," Proc. IEEE 16th Annual Int'l Conf. on Micro Electro Mechanical Systems, pp. 327-330, 2003.

Srinivasan et al., "Clinical Diagnostics on Human Whole Blood, Plasma, Serum, Urine, Saliva, Sweat, and Tears on a Digital Microfluidic Platform," Proc. Micro Total Analysis Systems (µTAS), pp. 1287-1290, 2003.

Srinivasan et al., "3-D Imaging of Moving Droplets for Microfluidics Using Optical Coherence Tomography," Micro Total Analysis Systems (µTAS), pp. 1303-1306, 2003.

Srinivasan et al., "Droplet-Based Microfluidic Lab-on-a-Chip for Glucose Detection," Analytica Chimica Acta, vol. 507, No. 1, pp. 145-150, 2004.

Srinivasan et al., "An Integrated Digital Microfluidic Lab-on-a-Chip for Clinical Diagnostics on Human Physiological Fluids," Lab on a Chip, vol. 4, pp. 310-315, 2004.

Srinivasan et al., "Protein Stamping for MALDI Mass Spectrometry Using an Electrowetting-Based Microfluidic Platform," Lab-on-a-Chip: Platforms, Devices, and Applications, Conf. 5591, SPIE Optics East, Philadelphia, Oct. 25-28, 2004.

Srinivasan, V., "A Digital Microfluidic Lab-on-a-Chip for Clinical Diagnostic Applications," Ph.D. thesis, Dep't of Electrical and Computer Engineering, Duke University, 2005.

Su et al., "Yield Enhancement of Digital Microfluidics-Based Biochips Using Space Redundancy and Local Reconfiguration," Proc. Design, Automation and Test in Europe (DATE) Conf., pp. 1196-1201, 2005.

Sudarsan et al., "Printed Circuit Technology for Fabrication of Plastic-Based Microfluidic Devices," Anal. Chem. 2004, vol. 76, pp. 3229-3235.

Tolun et al., "A Novel Fluorometric Enzyme Analysis Method for Hunter Syndrome Using Dried Blood Spots," Mol. Genet. Metab. (2012), doi:10.1016/j.ymgme.2001.12.011.

Wulff-Burchfield et al., "Microfluidic Platform Versus Conventional Real-Time Polymerase Chain Reaction for the Detection of Mycolpasma pneumoniae in Respiratory Specimens," Dignostic Microbiology and Infectious Disease, 2010, vol. 67, pp. 22-29.

Xu et al., "Digital Microfluidic Biochip Design for Protein Crystallization," IEEE-NIH, 2007.

Yi et al., "Soft Printing of Droplets Digitized by Electrowetting," 12th Int'l Conf. on Solid State Sensors, Actuators and Microsystems, Boston, Jun. 8-12, 2003, pp. 1804-1807.

Yi et al., "Geometric Surface Modification of Nozzles for Complete Transfer of Liquid Drops," Solid-State Sensor, Actuators and Microsystems Workshop, Hilton Head Island, South Carolina, Jun. 6-10, 2004, pp. 164-167.

Yi et al., "Characterization of Electrowetting Acutation on Addressable Single-Side Coplanar Electrodes," J. Micromech. Microeng. 2006, vol. 16, pp. 2053-2059, http://dx.doi.org/10.1088/0960-1317/16/10/018.

* cited by examiner

US 8,460,528 B2

REAGENT STORAGE AND RECONSTITUTION FOR A DROPLET ACTUATOR

2 RELATED APPLICATIONS

In addition to the patent applications cited herein, each of which is incorporated herein by reference, this patent application is related to and claims priority to U.S. Provisional Patent Application No. 60/980,622, filed on Oct. 17, 2007, entitled "Reagent Storage and Reconstitution for a Droplet Actuator," the entire disclosure of which is incorporated herein by reference.

1 GRANT INFORMATION

This invention was made with government support under DK066956-02 awarded by the National Institutes of Health of the United States. The United States Government has certain rights in the invention.

3 FIELD OF THE INVENTION

The present invention generally relates to the field of conducting droplet operations in a droplet actuator. In particular, the present invention is directed to on-board reagent storage, handling, and dispensing in droplet actuator systems.

4 BACKGROUND OF THE INVENTION

One of the challenges for developing portable microfluidics devices, such as portable droplet actuators, is the requirement for the delivery of specific biochemical reagents in a format that does not require cumbersome procedures for storage, reconstitution, and dispensing for tests to be conducted. Consequently, there is a need for improved technology for on-board reagent storage, handling, and dispensing in order to enable more versatile miniature analytical systems.

5 BRIEF DESCRIPTION OF THE INVENTION

The present invention is directed to on-board reagent storage, handling, and dispensing in droplet actuator systems.

In one embodiment, a fluidic analyzer is provided. The fluidic analyzer comprises a droplet actuator comprising a substrate including a plurality of electrodes configured to actuate a droplet and a reagent storage component in selective fluid communication with the droplet actuator and comprising a reagent configured to combine with a solvent at a time of use.

In another embodiment, a method of conducting fluidic analysis is provided. The method comprises storing a reagent within a reagent storage component in fluid communication with a droplet actuator comprising a plurality of electrodes configured to actuate a droplet and combining the reagent with a solvent at a time for use within the droplet actuator.

6 DEFINITIONS

As used herein, the following terms have the meanings indicated.

"Activate" with reference to one or more electrodes means effecting a change in the electrical state of the one or more electrodes which results in a droplet operation.

"Bead," with respect to beads on a droplet actuator, means any bead or particle that is capable of interacting with a droplet on or in proximity with a droplet actuator. Beads may be any of a wide variety of shapes, such as spherical, generally spherical, egg shaped, disc shaped, cubical and other three dimensional shapes. The bead may, for example, be capable of being transported in a droplet on a droplet actuator or otherwise configured with respect to a droplet actuator in a manner which permits a droplet on the droplet actuator to be brought into contact with the bead, on the droplet actuator and/or off the droplet actuator. Beads may be manufactured using a wide variety of materials, including for example, resins, and polymers. The beads may be any suitable size, including for example, microbeads, microparticles, nanobeads and nanoparticles. In some cases, beads are magnetically responsive; in other cases beads are not significantly magnetically responsive. For magnetically responsive beads, the magnetically responsive material may constitute substantially all of a bead or one component only of a bead. The remainder of the bead may include, among other things, polymeric material, coatings, and moieties which permit attachment of an assay reagent. Examples of suitable magnetically responsive beads are described in U.S. Patent Publication No. 2005-0260686, entitled, "Multiplex flow assays preferably with magnetic particles as solid phase," published on Nov. 24, 2005, the entire disclosure of which is incorporated herein by reference for its teaching concerning magnetically responsive materials and beads. The fluids may include one or more magnetically responsive and/or non-magnetically responsive beads. Examples of droplet actuator techniques for immobilizing magnetically responsive beads and/or non-magnetically responsive beads and/or conducting droplet operations protocols using beads are described in U.S. patent application Ser. No. 11/639,566, entitled "Droplet-Based Particle Sorting," filed on Dec. 15, 2006; U.S. Patent Application No. 61/039,183, entitled "Multiplexing Bead Detection in a Single Droplet," filed on Mar. 25, 2008; U.S. Patent Application No. 61/047,789, entitled "Droplet Actuator Devices and Droplet Operations Using Beads," filed on Apr. 25, 2008; U.S. Patent Application No. 61/086,183, entitled "Droplet Actuator Devices and Methods for Manipulating Beads," filed on Aug. 5, 2008; International Patent Application No. PCT/US2008/053545, entitled "Droplet Actuator Devices and Methods Employing Magnetic Beads," filed on Feb. 11, 2008; International Patent Application No. PCT/US2008/058018, entitled "Bead-based Multiplexed Analytical Methods and Instrumentation," filed on Mar. 24, 2008; International Patent Application No. PCT/US2008/058047, "Bead Sorting on a Droplet Actuator," filed on Mar. 23, 2008; and International Patent Application No. PCT/US2006/047486, entitled "Droplet-based Biochemistry," filed on Dec. 11, 2006; the entire disclosures of which are incorporated herein by reference.

"Droplet" means a volume of liquid on a droplet actuator that is at least partially bounded by filler fluid. For example, a droplet may be completely surrounded by filler fluid or may be bounded by filler fluid and one or more surfaces of the droplet actuator. Droplets may, for example, be aqueous or non-aqueous or may be mixtures or emulsions including aqueous and non-aqueous components. Droplets may take a wide variety of shapes; nonlimiting examples include generally disc shaped, slug shaped, truncated sphere, ellipsoid, spherical, partially compressed sphere, hemispherical, ovoid, cylindrical, and various shapes formed during droplet operations, such as merging or splitting or formed as a result of contact of such shapes with one or more surfaces of a droplet actuator.

"Droplet Actuator" means a device for manipulating droplets. For examples of droplets, see U.S. Pat. No. 6,911,132, entitled "Apparatus for Manipulating Droplets by Electrowetting-Based Techniques," issued on Jun. 28, 2005 to Pamula et al.; U.S. patent application Ser. No. 11/343,284, entitled "Apparatuses and Methods for Manipulating Droplets on a Printed Circuit Board," filed on Jan. 30, 2006; U.S. Pat. Nos. 6,773,566, entitled "Electrostatic Actuators for Microfluidics and Methods for Using Same," issued on Aug. 10, 2004 and 6,565,727, entitled "Actuators for Microfluidics Without Moving Parts," issued on Jan. 24, 2000, both to Shenderov et al.; Pollack et al., International Patent Application No. PCT/US2006/047486, entitled "Droplet-Based Biochemistry," filed on Dec. 11, 2006, the disclosures of which are incorporated herein by reference. Methods of the invention may be executed using droplet actuator systems, e.g., as described in International Patent Application No. PCT/US2007/009379, entitled "Droplet manipulation systems," filed on May 9, 2007. In various embodiments, the manipulation of droplets by a droplet actuator may be electrode mediated, e.g., electrowetting mediated or dielectrophoresis mediated.

"Droplet operation" means any manipulation of a droplet on a droplet actuator. A droplet operation may, for example, include: loading a droplet into the droplet actuator; dispensing one or more droplets from a source droplet; splitting, separating or dividing a droplet into two or more droplets; transporting a droplet from one location to another in any direction; merging or combining two or more droplets into a single droplet; diluting a droplet; mixing a droplet; agitating a droplet; deforming a droplet; retaining a droplet in position; incubating a droplet; heating a droplet; vaporizing a droplet; condensing a droplet from a vapor; cooling a droplet; disposing of a droplet; transporting a droplet out of a droplet actuator; other droplet operations described herein; and/or any combination of the foregoing. The terms "merge," "merging," "combine," "combining" and the like are used to describe the creation of one droplet from two or more droplets. It should be understood that when such a term is used in reference to two or more droplets, any combination of droplet operations sufficient to result in the combination of the two or more droplets into one droplet may be used. For example, "merging droplet A with droplet B," can be achieved by transporting droplet A into contact with a stationary droplet B, transporting droplet B into contact with a stationary droplet A, or transporting droplets A and B into contact with each other. The terms "splitting," "separating" and "dividing" are not intended to imply any particular outcome with respect to size of the resulting droplets (i.e., the size of the resulting droplets can be the same or different) or number of resulting droplets (the number of resulting droplets may be 2, 3, 4, 5 or more). The term "mixing" refers to droplet operations which result in more homogenous distribution of one or more components within a droplet. Examples of "loading" droplet operations include microdialysis loading, pressure assisted loading, robotic loading, passive loading, and pipette loading. In various embodiments, the droplet operations may be electrode mediated, e.g., electrowetting mediated or dielectrophoresis mediated.

"Filler fluid" means a fluid associated with a droplet operations substrate of a droplet actuator, which fluid is sufficiently immiscible with a droplet phase to render the droplet phase subject to electrode-mediated droplet operations. The filler fluid may, for example, be a low-viscosity oil, such as silicone oil. Other examples of filler fluids are provided in International Patent Application No. PCT/US2006/047486, entitled, "Droplet-Based Biochemistry," filed on Dec. 11, 2006; and in International Patent Application No. PCT/US2008/072604, entitled "Use of additives for enhancing droplet actuation," filed on Aug. 8, 2008.

"Immobilize" with respect to magnetically responsive beads, means that the beads are substantially restrained in position in a droplet or in filler fluid on a droplet actuator. For example, in one embodiment, immobilized beads are sufficiently restrained in position to permit execution of a splitting operation on a droplet, yielding one droplet with substantially all of the beads and one droplet substantially lacking in the beads.

"Magnetically responsive" means responsive to a magnetic field. "Magnetically responsive beads" include or are composed of magnetically responsive materials. Examples of magnetically responsive materials include paramagnetic materials, ferromagnetic materials, ferrimagnetic materials, and metamagnetic materials. Examples of suitable paramagnetic materials include iron, nickel, and cobalt, as well as metal oxides, such as $Fe_3O_4$, $BaFe_{12}O_{19}$, $CoO$, $NiO$, $Mn_2O_3$, $Cr_2O_3$, and $CoMnP$.

"Washing" with respect to washing a magnetically responsive bead means reducing the amount and/or concentration of one or more substances in contact with the magnetically responsive bead or exposed to the magnetically responsive bead from a droplet in contact with the magnetically responsive bead. The reduction in the amount and/or concentration of the substance may be partial, substantially complete, or even complete. The substance may be any of a wide variety of substances; examples include target substances for further analysis, and unwanted substances, such as components of a sample, contaminants, and/or excess reagent. In some embodiments, a washing operation begins with a starting droplet in contact with a magnetically responsive bead, where the droplet includes an initial amount and initial concentration of a substance. The washing operation may proceed using a variety of droplet operations. The washing operation may yield a droplet including the magnetically responsive bead, where the droplet has a total amount and/or concentration of the substance which is less than the initial amount and/or concentration of the substance. Other embodiments are described elsewhere herein, and still others will be immediately apparent in view of the present disclosure.

The terms "top" and "bottom" are used throughout the description with reference to the top and bottom substrates of the droplet actuator for convenience only, since the droplet actuator is functional regardless of its position in space.

When a liquid in any form (e.g., a droplet or a continuous body, whether moving or stationary) is described as being "on", "at", or "over" an electrode, array, matrix or surface, such liquid could be either in direct contact with the electrode/array/matrix/surface, or could be in contact with one or more layers or films that are interposed between the liquid and the electrode/array/matrix/surface.

When a droplet is described as being "on" or "loaded on" a droplet actuator, it should be understood that the droplet is arranged on the droplet actuator in a manner which facilitates using the droplet actuator to conduct one or more droplet operations on the droplet, the droplet is arranged on the droplet actuator in a manner which facilitates sensing of a property of or a signal from the droplet, and/or the droplet has been subjected to a droplet operation on the droplet actuator.

7 BRIEF DESCRIPTION OF THE DRAWINGS

Figure 12:
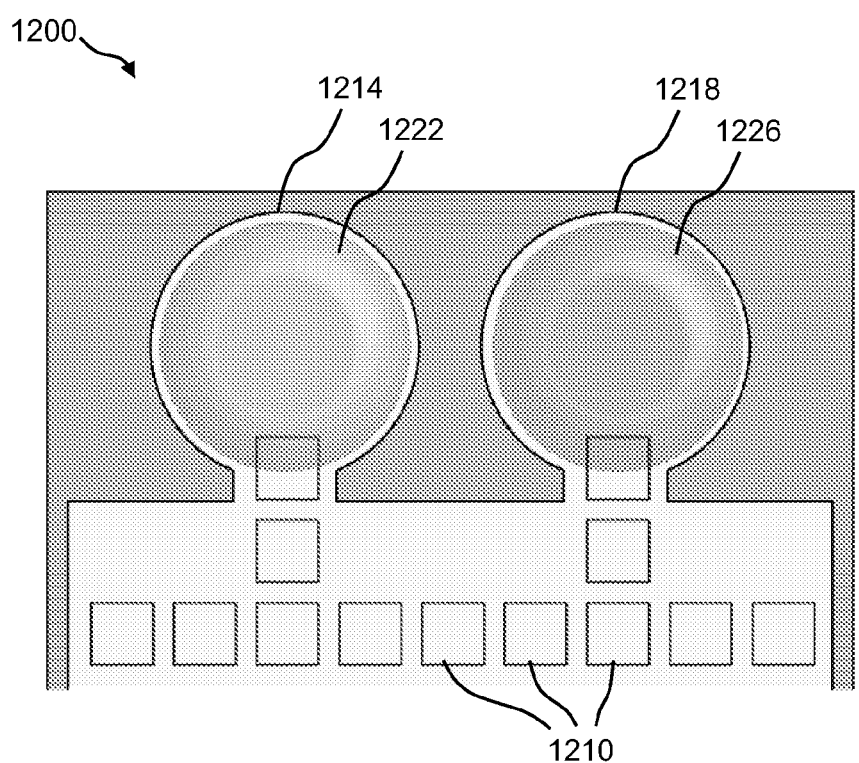
Figure 13:
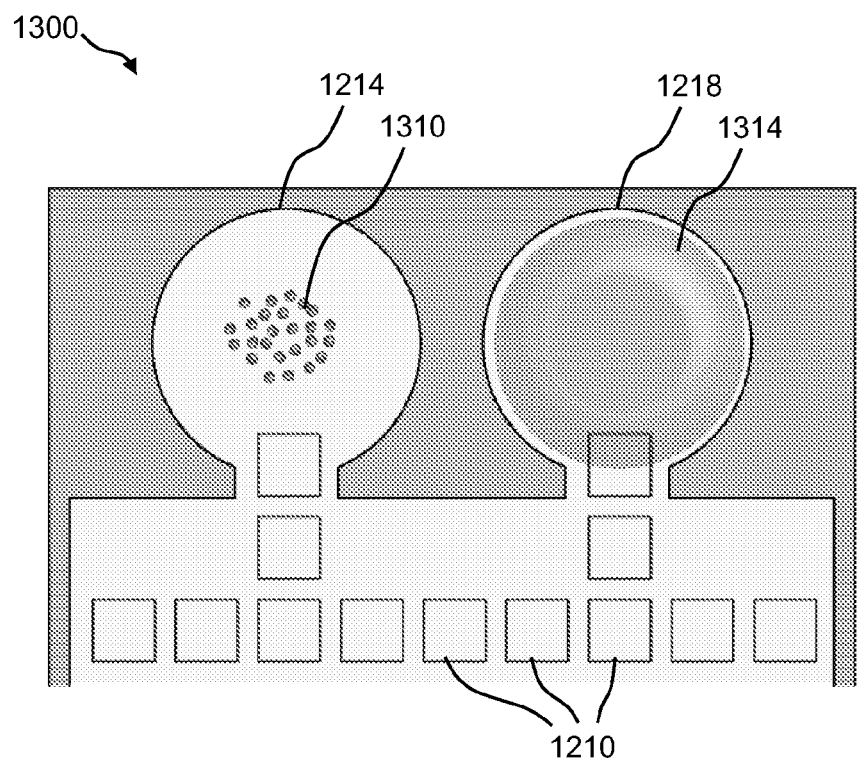

FIG. 12 illustrates a top view of an example droplet actuator in accordance with the present invention, particularly including an array, grid, or path of electrodes for performing droplet operations wherein one or more fluid reservoirs feed the array of electrodes; and FIG. 13 illustrates a top view of an example droplet actuator in accordance with the present invention, particularly including an array, grid, or path of electrodes for performing droplet operations wherein one or more fluid reservoirs feed the array of electrodes and a reservoir can include dried reagents.

8 DETAILED DESCRIPTION OF THE INVENTION

The invention provides approaches to storing reagents for use in a droplet actuator, such as a droplet actuator. The reagents may be stored in a concentrated form that requires dilution in a solvent to render them useful in an assay. Examples of suitable concentrated reagents include concentrated powders, particles and pellets, microcapsules, pastes, and generally any concentrated form. Reconstitution of concentrated reagents can be accomplished by combining the concentrated reagent with a solvent to yield a reconstituted reagent. For example, certain embodiments of the invention provide a droplet actuator including (1) a reservoir including a solvent, and (2) a concentrated reagent that is isolated from aqueous solutions. In such embodiments, a means is provided to bring the solvent into contact with the concentrated reagent. Such means may, for example, include transport or other movement of the concentrated reagent, the solvent or both. For example, the solvent may be transported into contact with the concentrated reagent using microfluidics channels and/or using droplet operations. As another example, the concentrated reagent may be transported into contact with the solvent by removing a barrier which separates the two and/or by mechanical action which places the concentrated reagent in contact with the solvent. These and other aspects of the invention are discussed in the ensuing sections.

8.1 Dried Reagents Associated with Reservoir

Figure 1A:
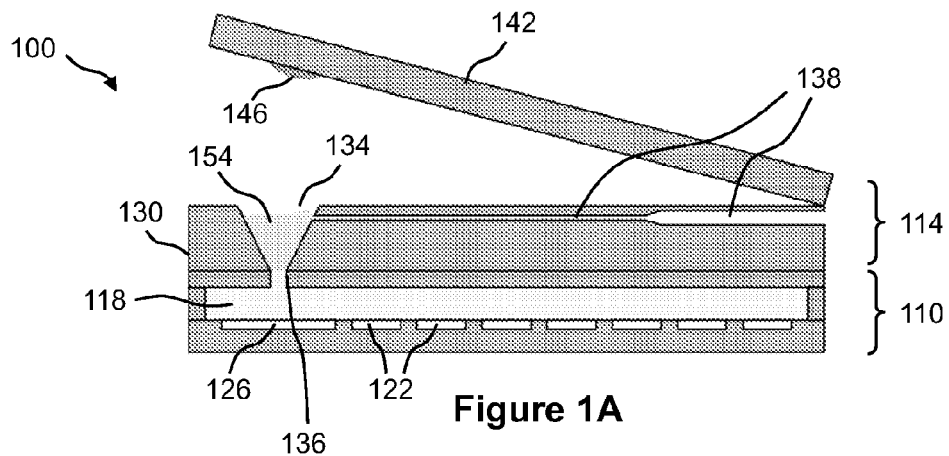
FIGS. 1A-1C illustrate side views of an example droplet actuator having on-board reagent storage, handling, and dispensing capabilities in accordance with the present invention.
Figure 1B:
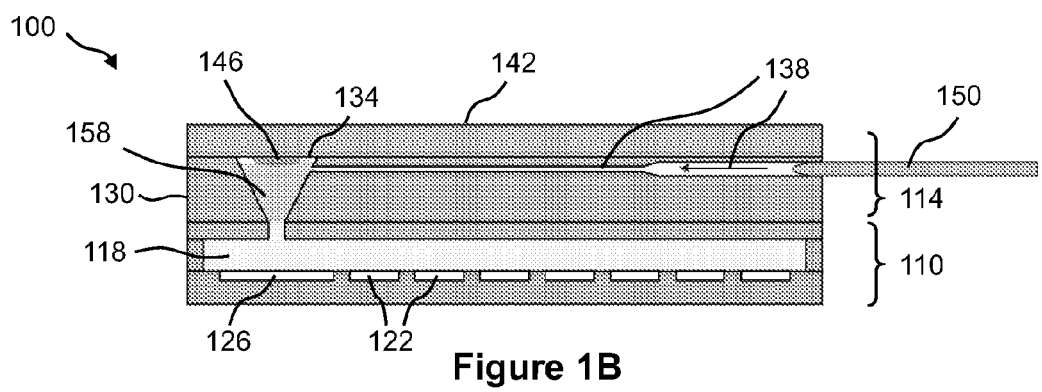
Figure 1C:
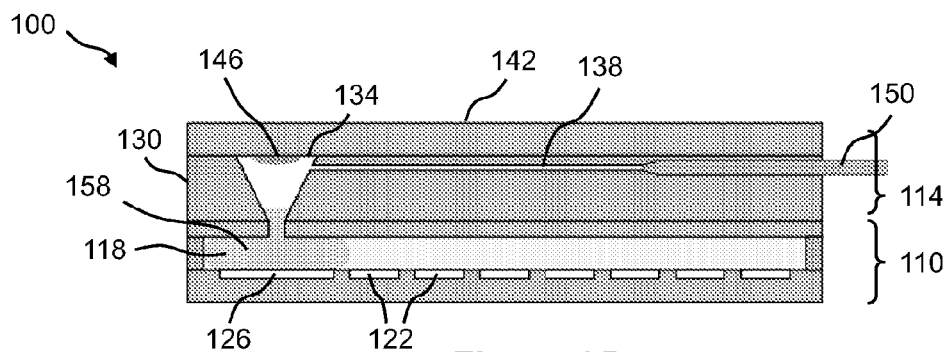

FIGS. 1A, 1B, and 1C illustrate side views of a droplet actuator 100. Droplet actuator 100 is designed to permit storage of a concentrated reagent and reconstitution of the concentrated reagent prior to or during use of the droplet actuator. Referring to FIG. 1A, droplet actuator 100 includes a droplet actuator 110 that is fluidly coupled, and in some cases may also be mechanically coupled, to a reagent storage component 114.

Droplet actuator 110 is formed of two substrates arranged with a gap 118 therebetween. A set of electrodes 122 is provided in association with one or both of the substrates and arranged to facilitate droplet operations in the gap 118 or elsewhere. For example, the electrodes 122 may be configured and arranged to conduct droplet operations in the gap by electrowetting. A reservoir electrode 126 may be provided for dispensing droplets within gap 118.

Reagent storage component 114 includes a body 130 that has a reservoir 134. Reagent storage component 114 may also include a channel 138 or other structure for applying a pressure and/or vacuum to the contents of reservoir 134. For example, channel 138 provides a fluid path from the outside of body 130 into reservoir 134.

Reservoir 138 includes an outlet 136 which forms a fluid path from the interior of the reservoir 134 into the gap 118. The position of outlet 136 may be arranged so that fluid flowing therethrough comes into contact with one or more reservoir electrodes 126 and/or droplet operation electrodes 122. In such an embodiment, fluid can flow from the reservoir 134 into the gap 118 and into the proximity of an electrode 126 and/or 122 such that the droplet is subject to droplet operations controlled by such electrode(s).

Reagent storage component 114 may include a cover 142. The cover 142 may, in some embodiments, be coupled in a hinged fashion to body 130. Cover 142 may include a quantity of concentrated reagent 146 adhered to or absorbed on a surface of cover 142 and/or absorbed on or in a substrate which is mounted on a surface of cover 142. For example, concentrated reagent 146 may be adhered to a pillar, or adhered to particles or beads, or absorbed in an absorbent material, any of which is arranged on a surface of cover 142. The concentrated reagent 146 may be arranged such that it substantially corresponds to the position of reservoir 134 when cover 142 is closed. In this manner, the action of closing cover 142 may be used to bring the concentrated reagent into contact with the contents of reservoir 134. Cover 142 may also be configured to seal reservoir 134 when cover 142 is in place. The concentrated reagent 146 is selected based on the intended use of the droplet actuator.

Referring to FIGS. 1B and 1C, droplet actuator 100 may also include a mechanism for applying a force to the contents of reservoir 134 in order to cause or enhance flow of fluid from the reservoir 134 into the gap 118. In the embodiment shown, the mechanism is a piston 150 and a corresponding fluid path 138 arranged for accepting the piston. The fluid path may, for example, be a channel or cylindrical opening which forms part of a fluid path extending from the piston and into the reservoir 134. Insertion of the piston 150 into fluid path 138 forces fluid, such as air, through fluid path 138 and into reservoir 134, thereby forcing fluid in reservoir 134 to flow into gap 118. It will be appreciated that the piston is exemplary of any force capable of causing or enhancing flow of fluid from reservoir 134 into gap 118. Examples of such forces include pressure, vacuum or electrically mediated forces or chemically induced forces.

The droplet actuator 100 may be provided with no fluid present in reservoir 134. This arrangement permits cover 142 to be closed and concentrated reagent 146 to be stored therein until ready for use in the field. At the time of use, a user may load a quantity of solvent 154 into reservoir 134 as shown in FIG. 1A. The user may close cover 142 to bring concentrated reagent 146 into contact with solvent 154, facilitating reconstitution of concentrated reagent 146 in solvent 154.

In another embodiment, droplet actuator 100 may be provided with solvent 154 present in reservoir 134. The top opening of reservoir 134 and concentrated reagent 146 may be sealed, e.g., with a film cover (not shown). During operation, a user may remove sealing cover (not shown) and close cover 142 to contact a quantity of solvent 154 with concentrated reagent 146. In some cases liquid 154 can be a fully-constituted liquid reagent in which case there may not be a concentrated reagent 146 corresponding to that particular reservoir.

FIGS. 1A, 1B, and 1C illustrate various configurations of the droplet actuator 100 during operation. FIG. 1A illustrates analyzer 100 with cover 142 open so that concentrated reagent 146 is not in contact with solvent 154. FIG. 1B shows cover 142 in a closed position so that concentrated reagent 146 contacts solvent 154 within reservoir 134, which causes concentrated reagent 146 to reconstitute into solution. In this position, concentrated reagent 146 is combined with solvent 154 to form a quantity of liquid reagent 158 within reservoir 134.

FIG. 1B also illustrates piston 150 in a position which is substantially outside of channel 138 of reagent storage component 114. Channel 138 is substantially full of fluid, such as air. FIG. 1C illustrates piston 150 inserted into channel 138, which displaces the fluid therein. More specifically, by forcing piston 150 into the channel 138, fluid within channel 138 flows toward reservoir 134. The fluid displaces a quantity of liquid reagent 158 within reservoir 134, thereby forcing a quantity of liquid reagent 158 into gap 118 in the vicinity of reservoir electrode 126. Once liquid reagent 158 is loaded within droplet actuator 110, droplets (not shown) may be dispensed from reservoir electrode 126 and droplet operations may occur along electrodes 122.

Figure 2A:
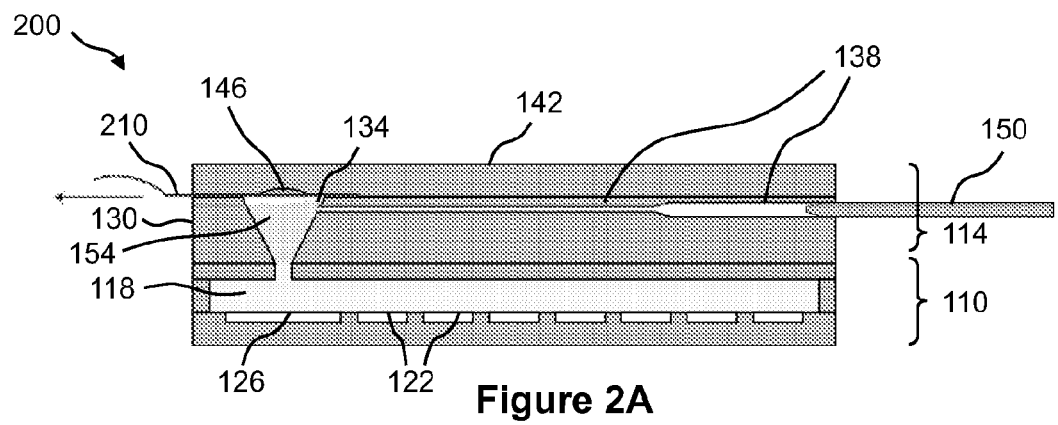
FIGS. 2A-2C illustrate side views of an example droplet actuator having on-board reagent storage, handling, and dispensing capabilities in accordance with the present invention, particularly further comprising a protective film covering the top opening of the reservoir and thereby retaining the quantity of concentrated reagent in the reservoir.
Figure 2B:
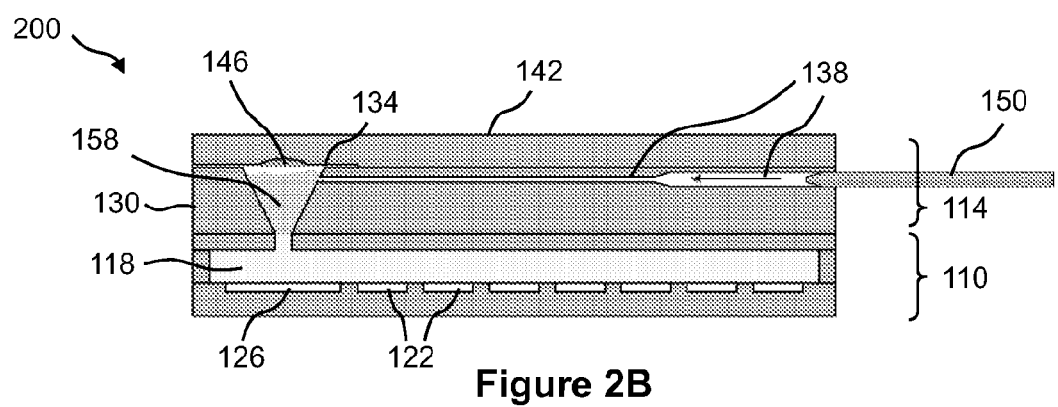
Figure 2C:
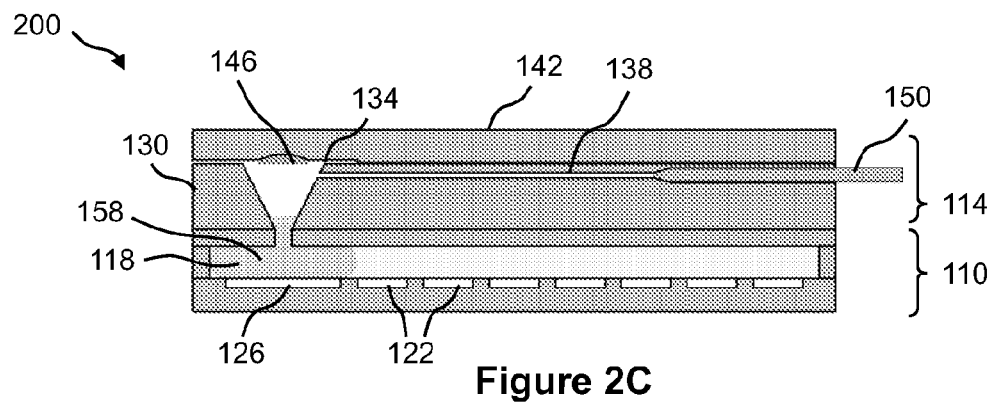

FIGS. 2A, 2B, and 2C illustrate side views of a droplet actuator 200, another example of a fluid analyzer configured for storing a concentrated reagent and reconstituting the concentrated reagent at the time of use. Droplet actuator 200 of FIG. 2 is substantially the same as droplet actuator 100 of FIG. 1, except that droplet actuator 200 additionally includes a protective film 210 covering the top opening of the reservoir 134 and thereby retaining the quantity of solvent 154 in the reservoir 134. In some embodiments, the film may adhere to the inner surface of cover 142. Even when reservoir 134 is filled with a quantity of fluid, such as solvent 154, protective film 210 prevents concentrated reagent 146 from contacting this fluid, thereby preventing its reconstitution therein. Protective film 210 may include a tab that allows a user to easily grasp protective film 210 for removal thereof.

In a related embodiment, the droplet actuator device includes two chambers separated by a puncturable material, such as film. The chambers may include components that require mixing prior to execution of a droplet assay. For example, a first chamber may include reagent and a second chamber may include solvent for reconstitution of the reagent to yield a reagent droplet. Or, as another example, the two chambers may include two different liquid reagents that are to be combined prior to use in a droplet assay. The device further includes a puncturing mechanism, such as a pointed spike, awl, needle, or spur. The puncturing mechanism may be configured to be actuated by a user in order to permit the contents of the chambers to combine. Thus, for example, the puncturing mechanism may be biased in, or otherwise locked into, a non-puncturing position during shipment. A user may engage the puncturing mechanism prior to, during, or after inserting the droplet actuator device into a droplet actuator control instrument.

In another embodiment, the droplet actuator device includes two chambers separated by a wax layer. In this embodiment, the separating wax layer may be heated to melt the wax and allow the two parts (e.g., reagent and solvent, or reagent A and reagent B) to mix. In a similar embodiment, the film layer, e.g., wax layer, is soluble in a filler fluid, such that when filler fluid is loaded, the film layer dissolves, enabling the two components to combine. In another similar embodiment, a soluble film layer, e.g., wax layer, is used to retain a reagent in a reservoir proximate to a droplet operations surface. When filler fluid is loaded, the film layer dissolves the wax to enable the reagent to be subjected to electrowetting.

Protective films of this and other embodiments may be formed, for example, from one of a variety of film materials that are supplied, for example, by CS Hyde Inc. (Lake Villa, Ill.). The protective film may be adhered to cover 142 and/or a top portion of reservoir 134 using a peelable or otherwise removable adhesive.

Droplet actuator 200 may be provided with protective film 210 installed, which allows cover 142 to be stored in a closed position and concentrated reagent 146 to be stored in place prior to use. Further, during storage, a quantity of solvent 154 may be confined in reservoir 134 of reagent storage component 114, as shown in FIG. 2A, and gap 118 of droplet actuator 110 may be filled with a quantity of filler fluid (not shown).

FIG. 2A illustrates protective film 210 in place, preventing concentrated reagent 146 from contacting solvent 154 in reservoir 134. FIG. 2B illustrates analyzer 200 with protective film 210 removed. In this configuration, concentrated reagent 146 can contact solvent 154 in reservoir 134. Concentrated reagent 146 can reconstitute into solution to form a quantity of liquid reagent 158 within reservoir 134. Like droplet actuator 100, droplet actuator 200 may be provided with a means for creating force capable of causing or enhancing flow of fluid from reservoir 134 into gap 118. Examples of such forces include pressure, vacuum or electrically mediated forces or chemically induced forces. In the example specifically illustrated, piston 150 may be used to displace fluid 158 from reservoir 134, substantially in the same manner as droplet actuator 100 as described in FIGS. 1A, 1B, and 1C.

Figure 3A:
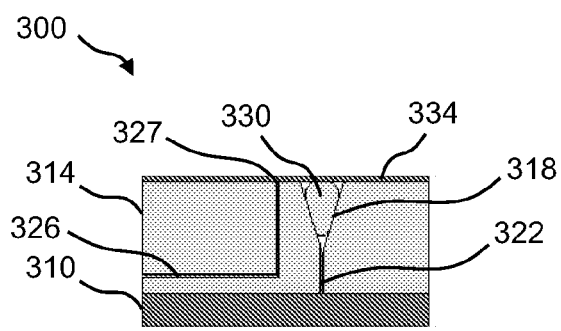
FIGS. 3A and 3B illustrate side views of an example droplet actuator in accordance with the present invention, particularly configured to permit a concentrated reagent and solvent to be present during storage and reconstituted for use.
Figure 3B:
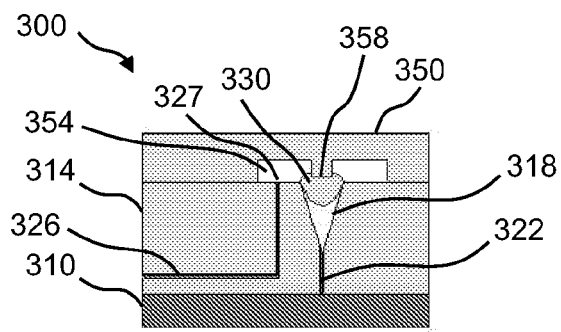

FIGS. 3A and 3B illustrate side views of a droplet actuator 300. Analyzer 300 is configured to permit a concentrated reagent and solvent to be present during storage and reconstituted for use. Referring to FIG. 3A, analyzer 300 includes a droplet actuator 310. Droplet actuator 310 is fluidly coupled, and may also be mechanically coupled, to a reagent storage component 314. Reagent storage component 314 includes a reservoir 318 that has an outlet fluid path 322 connecting reservoir 318 to an interior of the droplet actuator 310. Additionally, reagent storage component 314 includes a fluid path 326 that couples a pressure source (not shown) with outlet 327 in the vicinity of a top opening of reservoir 318. A quantity of fluid, such as a solvent 330, may be provided within reservoir 318. Reservoir 318 may be covered with a protective film 334. The opening of fluid path 326 adjacent to reservoir 318 may also be covered with a protective film. As illustrated here, protective film 334 may be adhered to the outer surface of reagent storage component 314 covering reservoir 318 and the opening of fluid path 326 adjacent to reservoir 318. Protective film 334 may include a tab (not shown) that allows a user to easily grasp protective film 334 for removal thereof.

Optionally, a plug (not shown) may be incorporated into the design in order to fit into the opening of fluid path 326. In operation, the plug may be extracted by the tension of protective film 334 as it is being removed.

Protective film 334 may be formed, for example, from one of a variety of film materials that are supplied, for example, by CS Hyde Inc. (Lake Villa, Ill.), which are suitable for long-term seal integrity over oil. Protective film 334 may be adhered to a surface of reagent storage component using, for example, a peelable or removable adhesive.

Droplet actuator 300 may be provided with protective film 334 installed. This arrangement permits the quantity of solvent 330 to be preloaded and contained within reservoir 318, until ready for use in the field. Additionally, a quantity of filler fluid (not shown) may be preloaded into droplet actuator 310.

FIG. 3B, illustrates droplet actuator 300 with cover 350 in place. Cover 350 is configured so that when in place a concentrated reagent 358 is aligned with reservoir 318. In this manner, concentrated reagent 358 can contact solvent 330 and be reconstituted therein.

Cover 350 includes a chamber 354 configured such that, when cover 350 is in place, chamber 354 provides a fluid path from the opening of fluid path 326 (adjacent to reservoir 318) into reservoir 318. In this arrangement, fluid from a pressure source (not shown) can be flowed in through fluid path 326, through outlet 327, through chamber 354 and into reservoir 318, forcing fluid 330 through fluid path 322 and into droplet actuator 310. Further, cover 350 is configured so that when it is in place, concentrated reagent 358 can contact solvent 330 in reservoir 318 and be reconstituted therein.

Figure 4A:
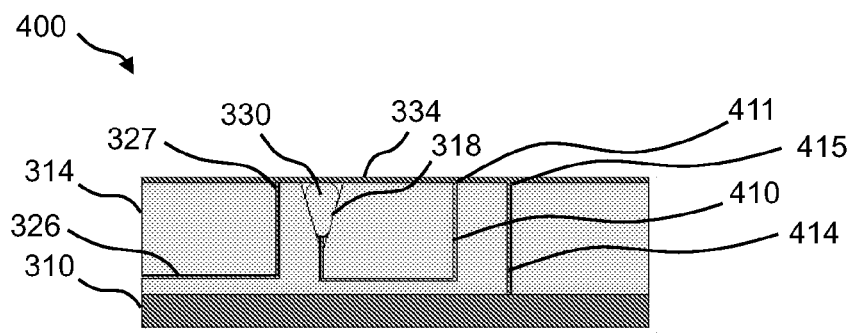
FIGS. 4A and 4B illustrate side views of an example droplet actuator in accordance with the present invention, particularly configured to permit a concentrated reagent and solvent to be present during storage and reconstituted for use and including modifications in order to separate/isolate the contents of the reservoir from the interior of the droplet actuator during storage.
Figure 4B:
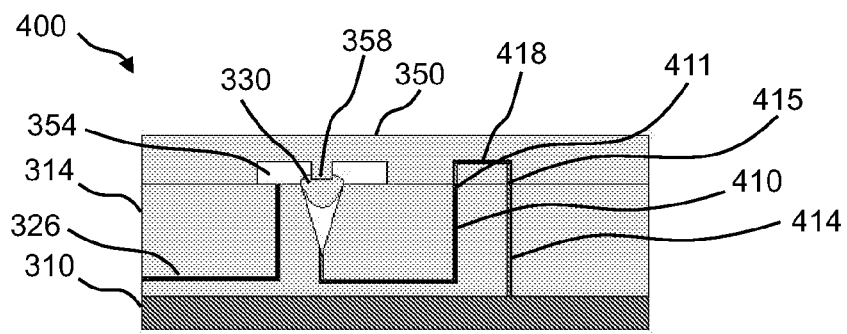

FIGS. 4A and 4B illustrate side views of a droplet actuator 400. Droplet actuator 400 is substantially the same as droplet actuator 300 of FIGS. 3A and 3B, except that modifications are provided in order to separate/isolate the contents of reservoir 318 from the interior of droplet actuator 310 during storage. This isolation may be useful to minimize interactions between solvent 330 and filler fluid, and/or prevent evaporation of recovery buffers, during storage.

In the embodiment shown, reagent storage component 314 includes an outlet fluid path 410 from reservoir 318 to outlet 411. Reagent storage component 314 includes a loading fluid path 414 that extends from inlet 415 through reagent storage component 314 and into droplet actuator 310. The fluid paths 410 and 414, may, for example, be capillaries.

Similar to FIG. 3A, FIG. 4A shows protective film 334 installed atop reagent storage component 314. Protective film 334 may block one or more of the outlet 327, top portion of the reservoir 318, outlet 411 and/or inlet 415.

Optionally, in combination with protective film 334, plugs (not shown) may be incorporated into the design in order to fit into the openings of outlet 327, top portion of the reservoir 318, outlet 411 and/or inlet 415. In one embodiment, the plugs may be removed by the tension of protective film 334 as it is being removed.

Additionally, FIG. 4B shows a fluid path 418 within cover 350 for connecting outlet 411 of fluid path 410 and inlet 415 of fluid path 414. In this manner, a fluid path is provided from reservoir 318 into droplet actuator 310. Droplet actuator 400 operates in substantially the same manner as droplet actuator 300 of FIGS. 3A and 3B. In short, a pressure source forces fluid through fluid path 326, into chamber 354, and fluid in chamber 354 is thereby forced into fluid path 410, into fluid path 418, into fluid path 414 and into droplet actuator 310.

Figure 5:
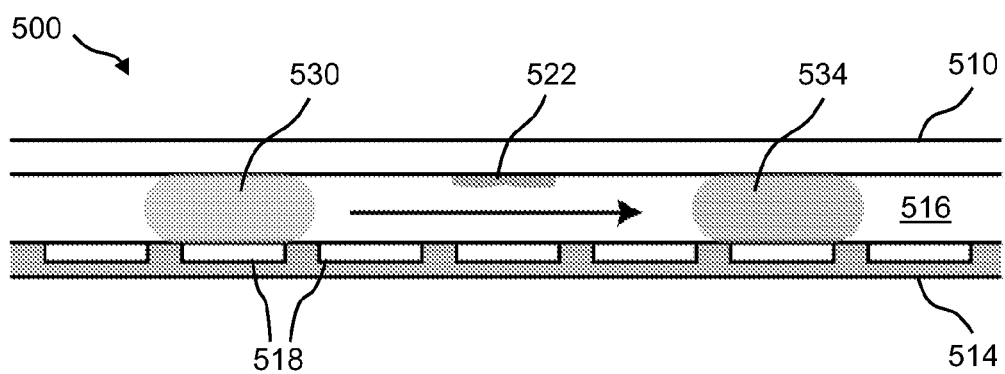
FIG. 5 illustrates a side view of an example droplet actuator in accordance with the present invention, particularly configured to operate with a concentrated reagent stored in a manner which permits a solvent droplet to be brought into contact with the concentrated reagent by means of droplet operations mediated by a set of electrodes.

FIG. 5 illustrates a side view of a droplet actuator 500. Droplet actuator 500 operates with a concentrated reagent stored in a manner which permits a solvent droplet to be brought into contact with the concentrated reagent by means of droplet operations mediated by a set of electrodes. Droplet actuator 500 includes two substrates, such as a top substrate 510 and a bottom substrate 514, that are arranged with a gap 516 therebetween. A set of electrodes 518, e.g., electrowetting electrodes, is associated with one or both of the substrates, e.g., with bottom substrate 514 of droplet actuator 500. The electrodes 518 are arranged for conducting droplet operations. A quantity of concentrated reagent 522 is dried upon an inner surface of droplet actuator 500. In one example, a quantity of concentrated reagent 522 is dried upon an inner surface of top substrate 510, as shown in FIG. 5.

Concentrated reagent 522 may be selected to be immiscible with the filler fluid (not shown). For example, the filler fluid may be oil based and the concentrated reagent may be aqueously soluble. In this embodiment, when contacting a water-based (aqueous) solvent droplet 530, concentrated reagent 522 may reconstitute into solution, forming reagent droplet 534. Similarly, an organically soluble concentrated reagent may be employed with an organic solvent droplet and a filler fluid which is immiscible with the organic solvent (e.g., air, water).

FIG. 5 shows a solvent droplet 530 that is transported using electrode-mediated droplet operations along electrodes 518, into contact with concentrated reagent 522. Concentrated reagent 522 is reconstituted into solution, forming reagent droplet 534. Reagent droplet 534 may then be used for performing assay operations. When in contact with concentrated reagent 522, droplet 530 may be agitated using the electrode-mediated droplet operations in order to facilitate more rapid dissolution of reagent 522 into solvent droplet 530.

8.2 Dried Reagents on Droplet Actuator Substrate

Figure 6:
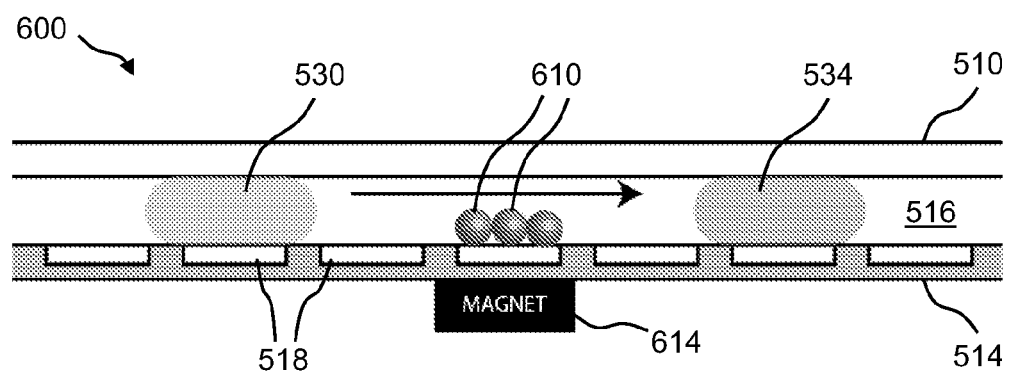
FIG. 6 illustrates a side view of an example droplet actuator in accordance with the present invention, particularly configured to operate with magnetically responsive beads in a manner which permits a solvent droplet to be brought into contact with the beads by means of droplet operations mediated by a set of electrodes.

FIG. 6 illustrates a side view of a droplet actuator 600. Droplet actuator 600 is substantially the same as droplet actuator 500 of FIG. 5, except that instead of providing concentrated reagent 522 on the surface of top substrate 510, a quantity of magnetically responsive beads 610 is provided. The magnetically responsive beads are coated with or otherwise include agents therein or thereon that can dissolve in a solvent. In one embodiment, the reagents are hydrophilic. A magnet 614 may be provided at a certain electrode 518 for retaining beads 610. The placement of magnet 614 determines the location at which the concentrated reagents are reconstituted.

Droplet actuator 600 operates substantially the same as droplet actuator 500 of FIG. 5. For example, FIG. 6 illustrates an aqueous or non-aqueous solvent droplet 530 that is transported along electrodes 518 into contact with beads 610. Beads 610 are retained in place by magnet 614. Some or all of the reagent associated with beads 610 may thus be reconstituted into solution in order to form reagent droplet 534. Reagent droplet 534 may be subject to further droplet operations, e.g., for performing assay operations.

Figure 7:
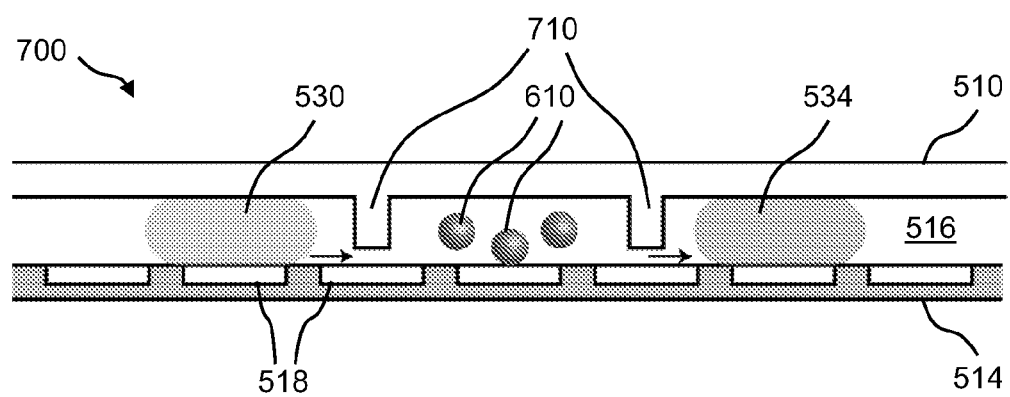
FIG. 7 illustrates a side view of an example droplet actuator in accordance with the present invention, particularly configured to operate with beads positioned in a manner between barriers which permits a solvent droplet to be brought into contact with the beads by means of droplet operations mediated by a set of electrodes.

FIG. 7 illustrates a side view of a droplet actuator 700. Droplet actuator 700 is substantially the same as droplet actuator 600 of FIG. 6, except that a physical barrier 710 is provided in place of magnet 614 for retaining beads 610. The placement of physical barrier 710 determines the location at which the concentrated reagents are reconstituted.

Droplet actuator 700 operates substantially the same as droplet actuator 500 of FIG. 5 and droplet actuator 600 of FIG. 6. For example, FIG. 7 shows solvent droplet 530 that is transported along electrodes 518 into contact with beads 610, which are retained within physical barrier 710. Consequently, the solvent droplet 530 can be transported using droplet operations into contact with the beads 610. The concentrated reagent associated with beads 610 is reconstituted into solution in order to form reagent droplet 534. Reagent droplet 534 may then be subject to further droplet operations, e.g., transporting reagent droplet 534 away from beads 610, which are retained in place by barrier 710, for performing assay operations.

Figure 8:
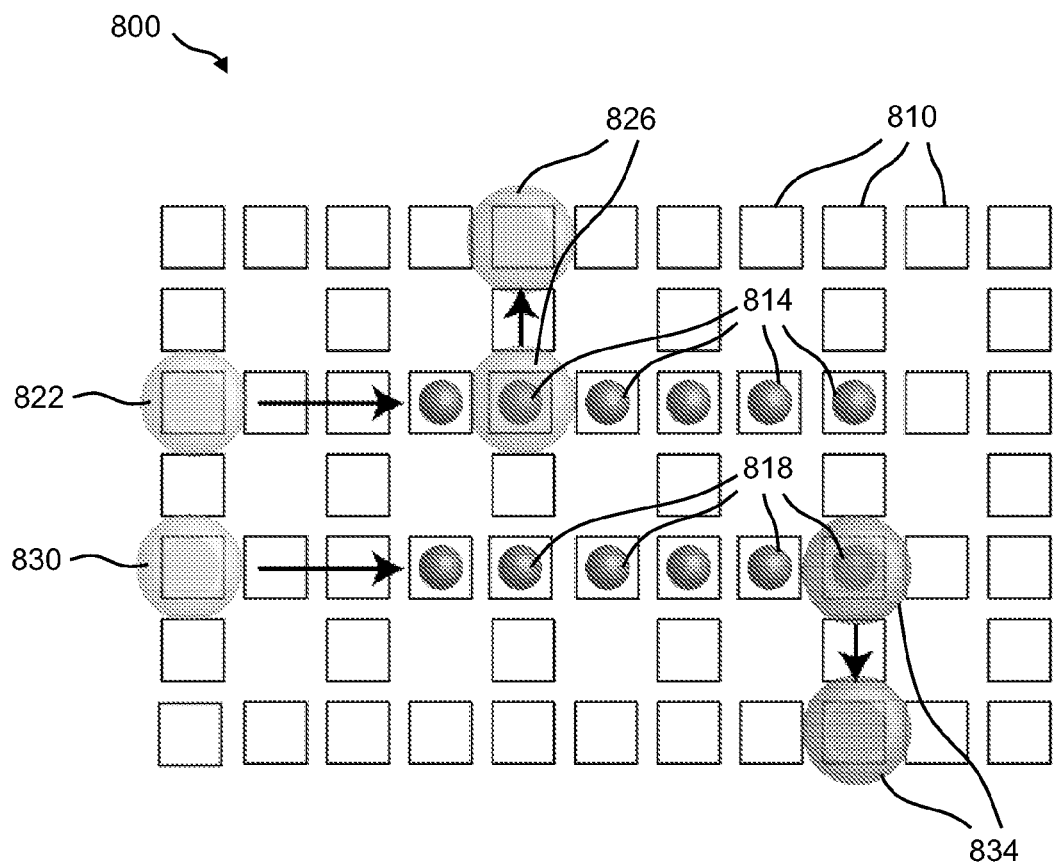
FIG. 8 illustrates a top view of an example droplet actuator in accordance with the present invention, particularly including an array or grid of electrodes for performing droplet operations wherein one or more paths of electrodes may be associated with a series of concentrated reagents.

FIG. 8 illustrates a top view of a droplet actuator 800. Droplet actuator 800 includes an array or grid of electrodes 810, e.g., electrowetting electrodes, for performing droplet operations. One or more paths of electrodes 810 may be associated with a series of concentrated reagents, illustrated here as concentrated reagents 814 and 818. The reagents 814 and/or 818 may be the same or different. They are associated with transport electrodes in a manner which permits them to reconstitute into a solvent droplet 822, 830 which is transported along the electrode path.

By use of these series of concentrated reagents, the dose or concentration of reagent that is reconstituted may be controlled by moving a droplet along electrodes 810 and controlling the number of instances at which it comes into contact with the concentrated reagents. In one example and referring to FIG. 8, a solvent droplet 822 is transported along a path of electrodes 810 and may come into contact with two instances of concentrated reagents 814. As a result, a reagent droplet 826 of a certain reagent concentration (i.e., corresponding to two exposures to concentrated reagents 814) is directed away from the concentrated reagents 814 and used for performing assay operations. In another example, a solvent droplet 830 is transported along another path of electrodes 810 and may come into contact with six instances of concentrated reagents 818. As a result, a reagent droplet 834 of a certain reagent concentration (i.e., corresponding to six exposures to concentrated reagents 818) is transported away from the concentrated reagents 818. Once the desired concentration of reagent has been achieved, the reagent droplet 826, 834 can be transported to a downstream process, such as contacting additional concentrated reagent to add a different component to the droplet and/or combined using droplet operations with one or more other droplets for performing assay operations.

The types of concentrated reagents, such as concentrated reagents 814 and 818, may be any combination of one or more types of assay reagents and arranged in any order or sequence, depending on the intended assay operations. Furthermore, the instances of concentrated reagents may be installed and held within droplet actuator 800 via, for example, any of one of or any combinations of the techniques described in FIGS. 5, 6, and 7. Further, referring to FIG. 8, instances of concentrated reagents along a specific path may be the same or different. Use of different concentrated reagents 814 and/or 818 may permit substances that would otherwise adversely react if stored together to be stored on droplet actuator and reconstituted for use.

8.3 Dried Reagents Inserted into Droplet Actuator Gap

Figure 9A:
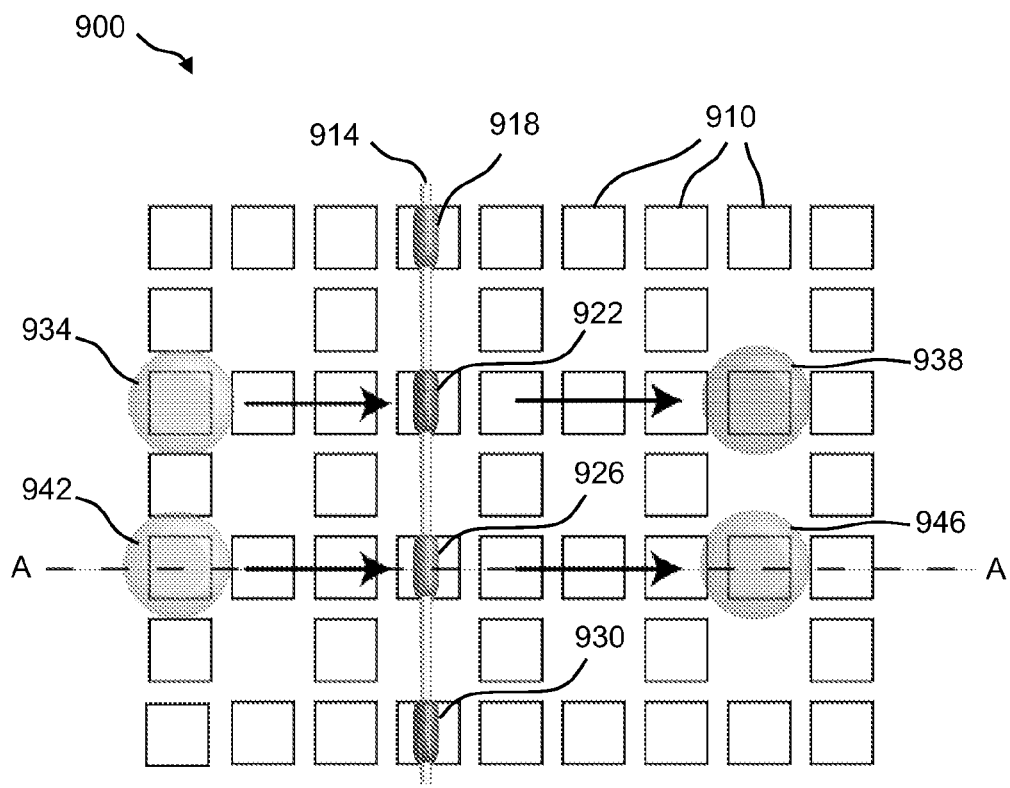
FIGS. 9A and 9B illustrate a top view and side view, respectively, of a section of an example droplet actuator in accordance with the present invention, particularly including an array or grid of electrodes for performing droplet operations wherein along one or more paths of electrodes may be a filament that has a series of concentrated reagents deposited thereon.
Figure 9B:
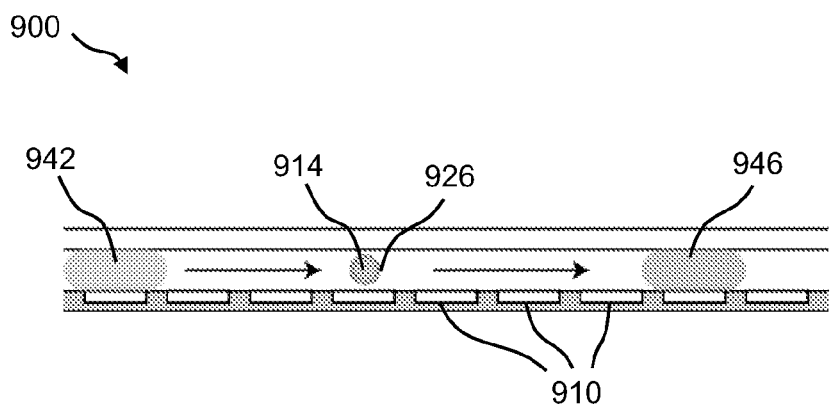

FIGS. 9A and 9B illustrate a top view and cross-sectional view, respectively, of a section of a droplet actuator 900. Droplet actuator 900 includes an array or grid of electrodes 910, e.g., electrowetting electrodes, for performing droplet operations. Installed along one or more paths of electrodes 910 may be a filament 914 that has a series of concentrated reagents 918, 922, 926, 930, etc. deposited thereon. Concentrated reagents are spaced in order to substantially correspond to the spacing of electrodes 910. Concentrated reagents 918 and 926 may, for example, be different types of assay reagents. In one example, an arrangement of concentrated reagents 918 and 926 are formed in bands around the cross-section of filament 914 and installed in droplet actuator 900, as shown in FIG. 9A.

FIG. 9B shows a cross-sectional view of droplet actuator 900 that is taken along line AA of FIG. 9A. FIG. 9B shows, for example, an instance of concentrated reagent 926 that is formed in a band around filament 914. Filament 914 may, for example, be formed of glass, metal wire, polymer, or other material suitable for coating with bands of concentrated reagents. Filament 914 may be rigid or flexible. Filament 914 may be a defined length of filament or an elongated filament, e.g., as shown in FIG. 10 (described below), which in either case is fed through droplet actuator 900 at the time of use.

Once filament 914 is inserted into droplet actuator, certain concentrated reagents may be selectively reconstituted by directing droplets to different positions in droplet actuator 900. The filament may include marks for ensuring proper alignment when the filament is inserted into the droplet actuator.

In one example, FIG. 9A shows a solvent droplet 934 that is transported along electrodes 910 into contact with concentrated reagent 922. Concentrated reagent 922 is reconstituted into solution, forming reagent droplet 938, which may then be transported to a downstream process. FIG. 9A shows a solvent droplet 942 that is transported along electrodes 910 into contact with concentrated reagent 926, which may be a different type of reagent than concentrated reagent 922. Concentrated reagent 926 is reconstituted into solution, forming reagent droplet 946, which may then be transported to a downstream process.

Figure 10:
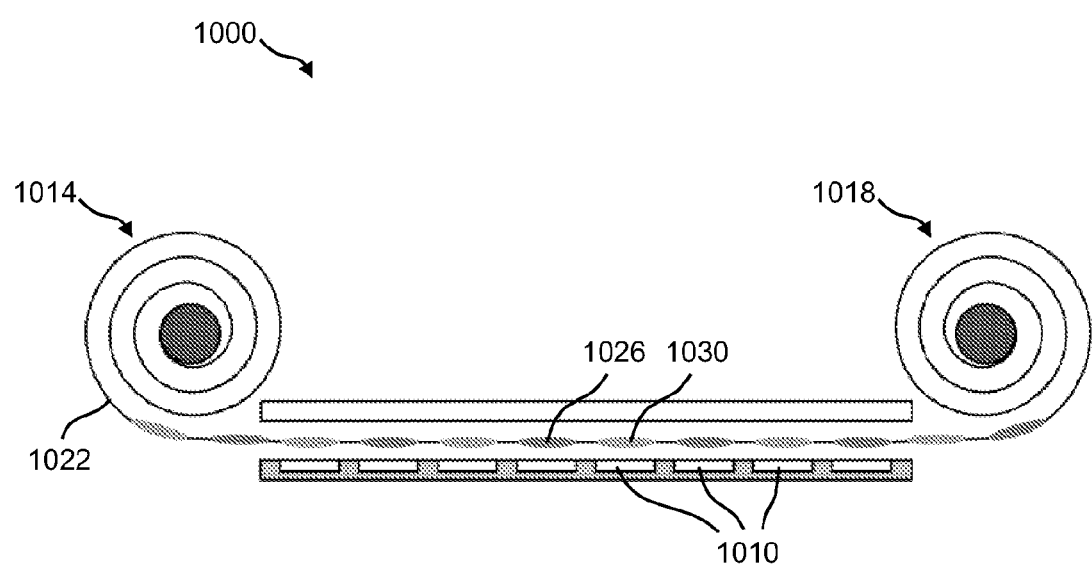
FIG. 10 illustrates a side view of an example droplet actuator in accordance with the present invention, particularly including an array or grid of electrodes for performing droplet operations wherein along one or more paths of electrodes may be a reel of filament for feeding a series of concentrated reagents in a continuous fashion.

FIG. 10 illustrates a side view of a section of a droplet actuator 1000. Droplet actuator 1000 is substantially the same as droplet actuator 900 of FIGS. 9A and 9B, except that filament 914, which may be a defined length, is replaced with a reel of filament for feeding a series of concentrated reagents through droplet actuator 1000 in a continuous fashion. By controlling the feed rate, the concentrated reagent spacing and the droplet operations, one or more concentrated reagents may be selectively reconstituted within one or more droplets within the droplet actuator.

For example, droplet actuator 1000 includes set of electrodes 1010, e.g., electrowetting electrodes, for example, on the bottom substrate of droplet actuator 1000. Located external to droplet actuator 1000 is, for example, a payout reel 1014 and a take-up reel 1018. A length of flexible filament 1022 is wound on payout reel 1014, fed through droplet actuator 1000, and returned to take-up reel 1018. Filament 1022 may, for example, be formed of a flexible glass fiber, flexible metal wire, a flexible suture, or a flexible polymer that is suitable for coating with bands of reagents. Additionally, multiple bands of one or more types of concentrated reagents, such as concentrated reagents 1026 and 1030, may be formed on flexible filament 1022, in order to provide a library of different types of assay reagents. The spacing of concentrated reagents may substantially correspond to the spacing of electrodes 1010.

Droplet actuator 1000 operates substantially the same as droplet actuator 900 of FIGS. 9A and 9B, except that a continuous supply of concentrated reagents may be fed through droplet actuator 1000 by the rotational action of payout reel 1014 to take-up reel 1018, in order to allow a continuous series of assay operations. In this way, the reel-to-reel concept of droplet actuator 1000 provides a component for forming a high throughput system.

Referring again to droplet actuator 900 of FIGS. 9A and 9B and droplet actuator 1000 of FIG. 10, operations may occur in reverse in order to deposit reagents on a filament. For example, such operations may be used to create a structure that has concentrated reagents, rather than for consuming the concentrated reagents. For example, an empty filament may be fed through a droplet actuator, such as droplet actuator 900 or droplet actuator 1000, and droplets may be transported into contact with the filament for loading concentrated reagents thereon. Having formed one or more instances of assay reagents on the filament within the droplet actuator, the filament may exit the droplet actuator with droplets and/or reagents attached thereto. Droplets may be dried, leaving instances of concentrated reagent on the filament.

8.4 Dried Reagents Loaded into Reservoir

Figure 11:
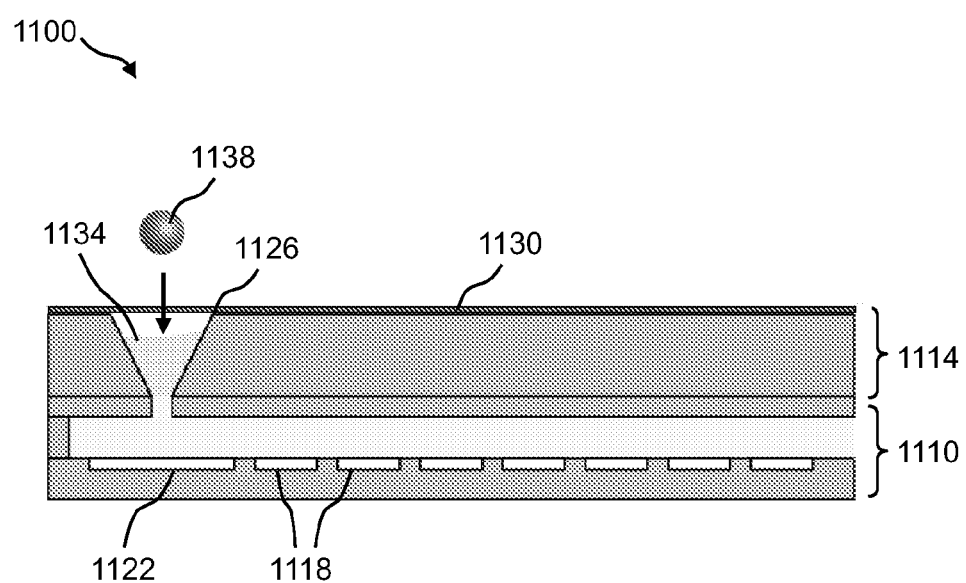
FIG. 11 illustrates a side view of an example droplet actuator in accordance with the present invention, particularly including a droplet actuator that is mechanically and fluidly connected to a reagent reconstitution component.

FIG. 11 illustrates a side view of a section of a droplet actuator 1100. Droplet actuator 1100 includes a droplet actuator 1110 that is mechanically and fluidly connected to a reagent reconstitution component 1114.

Droplet actuator 1110 is formed of a two substrates, such as a bottom substrate and top substrate, that are arranged with a gap therebetween. A set of electrodes 1118, e.g., electrowetting electrodes, are provided, for example, on the bottom substrate of droplet actuator 1110. Additionally, a reservoir electrode 1122 can be provided for dispensing droplets within the gap of droplet actuator 1110.

Reagent reconstitution component 1114 includes a reservoir 1126. Reservoir 1126 includes an outlet that opens into the interior of the droplet actuator 1110. In the embodiment shown, the opening is aligned so that fluid flowing therethrough will arrive in proximity to reservoir electrode 1122.

In one example, droplet actuator 1100 may be initially provided with droplet actuator 1110 preloaded with filler fluid (not shown) and with reservoir 1126 preloaded with a quantity of solvent 1134. A seal 1130 may be provided atop reservoir 1126. Seal 1130 may be removed or punctured at the time of use. A quantity of concentrated reagent may be provided with the droplet actuator, e.g., in a kit, or the user may provide the concentrated reagent.

At the time of use, seal 1130 may be removed or punctured, which exposes the contents of reservoir 1126. A quantity of concentrated reagent is combined with solvent 1134 in reservoir 1126. In one example, one or more beads 1138 that have a quantity of assay reagents dried thereon or absorbed therein are placed in reservoir 1126. The concentrated reagent associated with beads 1138 is reconstituted into solution to yield a quantity of liquid reagent in reservoir 1126. Subsequently, the liquid reagent from reservoir 1126 may be dispensed into an interior of droplet actuator 1110 and into proximity with reservoir electrode 1122. Droplets (not shown) may be dispensed therefrom for manipulation via electrodes 1118. This embodiment allows the user to select any suitable reagent at time of use, depending on assay to be executed.

In an alternative embodiment, solvent 1134 is provided with a reagent therein, and there is not need for addition of a concentrated reagent. In this embodiment, the reagent is loaded into the droplet actuator by pressure, chemical means, and/or electrical means, where it is subject to droplet operations and may be used in assay operations.

8.5 Reagents Stored in On-Actuator Reservoir

FIG. 12 illustrates a top view of a section of a droplet actuator 1200. Droplet actuator 1200 includes an array, grid, or path of electrodes 1210, e.g., electrowetting electrodes, for performing droplet operations. Feeding the array or grid of electrodes 1210 is one or more fluid reservoirs, e.g., fluid reservoirs 1214 and 1218.

In this example, fluid reservoirs 1214 and 1218 may be provided with a liquid reagent. Fluid reservoir 1214 may be filled with a liquid reagent 1222, which may be a first type of liquid reagent. Additionally, fluid reservoir 1218 may be filled with a liquid reagent 1226, which may be another type of liquid reagent. At the time of use, droplets from the liquid reagents of fluid reservoirs 1214 and 1218 are dispensed using droplet operations onto electrodes 1210. Electrodes may be associated with fluid reservoirs 1214 and 1218, e.g., planar electrodes located under the reagents in the reservoirs, which may be useful to facilitate dispensing of droplets from the reservoirs. Any number of such fluid reservoirs may be provided in fluid communication with droplet operations surface 1211. In some cases, the bottom surface of the reservoir forms a contiguous part of the droplet operations surface of the droplet actuator.

In one embodiment, the filler fluid is a wax or oil that thickens or solidifies below operating temperature. The thickened or solidified filler fluid may help to retain the reagents in place during storage and/or transport. During use, the droplet actuator can be heated to operational temperature, and thereby permit droplet operations to be conducted using the stored reagents. In this embodiment, reservoirs may be defined by a gasket or may remain open, i.e., the interior gap of the droplet actuator may have an open architecture without lateral barriers.

FIG. 13 illustrates a top view of a droplet actuator 1300. Droplet actuator 1300 is substantially the same as droplet actuator 1200 of FIG. 12, except that it illustrates a reservoir including dried reagents.

In particular, FIG. 13 shows a reagent storage state and a reagent use state. For example, FIG. 13 shows a quantity of concentrated reagent 1310 that is loaded into fluid reservoir 1214 and ready for reconstitution. In one example, concentrated reagent 1310 may be reagents that are dried onto beads, which are sized to stay in the fluid reservoir. Concentrated reagent 1310 may be adhered to a surface of reservoir 1214, such as the top substrate (not shown) of droplet actuator 1300. By contrast, FIG. 13 shows a quantity of liquid reagent 1314 within fluid reservoir 1218, which may be the result of a concentrated reagent, such as concentrated reagent 1310, that has been reconstituted into a recovery solution, such as a buffer solution, in order to form a liquid reagent 1314. Solvent for reconstituting concentrated reagent may be introduced by a port, e.g., in a top substrate (not shown) and/or by using droplet operations to introduce the solvent into the reservoir from other sections of the droplet actuator.

In various embodiments, dried reagents may be stored in the droplet actuator, liquid reagents may be stored in the droplet actuator, or both liquid and dried reagents may be stored in the droplet actuator.

8.6 Reagents and Sample Liquids

In some cases, dry reagents may be stored in association with a droplet actuator of the invention, an instrument associated with a droplet actuator of the invention, and/or a cartridge associated with a droplet actuator of the invention. Reagents may be dried on a solid surface in association with a droplet actuator of the invention, an instrument associated with a droplet actuator of the invention, and/or a cartridge associated with a droplet actuator of the invention. Reagents may be dried on a porous matrix in association with a droplet actuator of the invention, an instrument associated with a droplet actuator of the invention, and/or a cartridge associated with a droplet actuator of the invention. Dried reagent pellets may be provided in association with a droplet actuator of the invention, an instrument associated with a droplet actuator of the invention, and/or a cartridge associated with a droplet actuator of the invention. Dried reagent-coated beads may be provided in association with a droplet actuator of the invention, an instrument associated with a droplet actuator of the invention, and/or a cartridge associated with a droplet actuator of the invention.

The surface holding the dried reagents may be the droplet operations surface, a top substrate (when present), a substrate interposed between top and bottom substrates, a capillary or other fluid passage coupling the interior of the droplet actuator with an exterior of the droplet actuator, and/or a lid or covering of the droplet actuator. Dried reagents and/or liquid reagents may be provided in separate packaging along with a droplet actuator of the invention, e.g., as a collection of items in a kit.

In some cases, the dried reagent is provided in a well fluidically connected to the droplet actuator. In other cases, the dried reagent is provided on a substrate, such a post, that can be inserted into a liquid-containing reservoir. The liquid containing reservoir may be in fluid communication with the droplet actuator gap. In some cases, the dried reagent is provided on a PCB based droplet operations substrate. Visible fiduciary marks for alignment may be provided.

In some cases, the dried reagent is provided in or on a wall of a reservoir that is coupled in fluid communication with an interior of the droplet actuator. In some cases, the dried reagent is provided in or on a wall of a reservoir that is coupled in fluid communication with the gap of the droplet actuator.

Where reagent is provided on a separate substrate, such as a post, an array substrates may be simultaneously inserted into or contacted with an array of wells, e.g., upon closing of a cover including the substrates. Posts can include features allowing them to pierce protective foil as they are pressed onto the droplet actuator and dip into wells including with recovery buffer. A post array may also be inserted into the droplet actuator as a separate part during assembly. In some cases, the invention provides a set of post arrays with different assays suitable for use with a single standard droplet actuator.

In some cases, all reagents are preloaded on the droplet actuator, which is filled with a filler fluid, such as an oil filler fluid, and shipped to the user. The user may simply load the sample, insert the droplet actuator into the instrument, initiate software controlling the execution of a protocol on the droplet actuator, and read the result. In some cases, a retaining structure may be provided in the droplet actuator to retain liquid reagents during shipping.

In some cases, the droplet actuator is configured so that insertion of the droplet actuator into the instrument can actuate breakage of protective layers and transfer of reagent solutions into position where they can be subjected to droplet operations.

In other embodiments, dry reagents are provided in the droplet actuator, while recovery buffer and filler fluid are loaded into the instrument and pumped into the droplet actuator by the instrument. In this embodiment, a fluidics connection is provided between the instrument and the droplet actuator.

In another embodiment, dry and liquid reagents are provided in the droplet actuator. In this embodiment, no fluidics connection is required between the droplet actuator and the instrument. Filler fluid, such as oil, may also be stored on the droplet actuator. In another embodiment, the only solutions other than filler fluid provided in the droplet actuator are buffers, e.g., wash buffer, lysis buffer if necessary, and/or recovery buffer(s) for all other reagents. Moreover, even the wash and lysis buffers may be provided in an incomplete form, with one or more of their components stored in dry form reconstituted before or during use.

Dry reagents may be packaged in the path of reconstitution buffer as it passes from storage reservoir into a receiving area on the droplet actuator. The dried reagents themselves could be on solid surface or in a powder or bead form. Buffer movement may be insertion-actuated, i.e., insertion of the droplet actuator into the instrument may force loading of buffer.

In some cases, filler fluid transfer into the droplet actuator is delayed. Filler fluid loading may, for example, be actuated upon insertion of the droplet actuator into the instrument, closing of a lid following insertion of the droplet actuator into the instrument, initiated mechanically or by user-initiated software. Recovery buffers may in some cases be delivered to reconstitution sites by droplet operations. In some cases the droplet actuator is operated without oil.

PCR Methods Appl. 1995 4: 376-379 describes trehalose preservation of dried PCR mix, suitable for use with the present invention. Whitesides group (Anal. Chem. 2005, 77, 64-71) describes suitable storage of immunoassay reagents as air-separated liquid plugs in capillary. Electrophoresis 2004, 25, 1705-1713 describes suitable techniques for storing antibodies. Analytica Chimica Acta 362 (1998) 35-45) describes plate-dried components and stabilizers suitable for use in immunoassays. The entire disclosure of each of the foregoing references is incorporated herein by reference for its teaching concerning preparation and reconstitution of dried reagents.

The following patents describe various teachings applicable to the making, storing and reconstitution of dried reagents which may be used in conjunction with the present invention: Abbott Laboratories, U.S. Pat. No. 4,195,060, entitled "Liquid reagent cartridge cuvette"; Abbott Laboratories, U.S. Pat. No. 5,294,404, entitled "Reagent pack for immunoassays"; Abbott Laboratories, U.S. Pat. No. 5,320,808, entitled "Reaction cartridge and carousel for biological sample analyzer"; Accumetrics, U.S. Pat. No. 6,016,712, entitled "Device for receiving and processing a sample"; Alphahelix A B, U.S. Pat. No. 6,432,694, entitled "Cartridge and system for storing and dispensing of reagents"; Applied Biotech, Inc., U.S. Pat. No. 6,669,908, entitled "Urine test device"; Auric Enterprises, LLC, U.S. Pat. No. 7,344,893, entitled "Immuno-gold lateral flow assay"; AVL Scientific Corporation, U.S. Pat. No. 5,279,797, entitled "Disposable liquid reagent cartridge and receptacle therefor"; Beckman Coulter, Inc., U.S. Pat. No. 5,985,218, entitled "Reagent cartridge"; Beckman Instruments, Inc., U.S. Pat. No. 4,970,053, entitled "Reagent cartridge"; Beckman Instruments, Inc., U.S. Pat. No. 5,031,797, entitled "Reagent storage and delivery system"; Beckman Instruments, Inc., U.S. Pat. No. 5,075,082, entitled "Reagent cartridge"; Biotrack, Inc., U.S. Pat. No. 5,223,219, entitled "Analytical cartridge and system for detecting analytes in liquid samples"; Byk Sangtec Diagnostica GmbH & Co. KG, U.S. Pat. No. 6,149,872, entitled "Modular reagent cartridge"; Cambridge Life Sciences PLC, U.S. Pat. No. 7,132,078, entitled "Assay apparatus"; Carolina Liquid Chemistries Corporation, U.S. Pat. No. 5,968,453, entitled "Reagent cartridge"; Cepheid, U.S. Pat. No. 6,440,725, entitled "Integrated fluid manipulation cartridge"; Cepheid, U.S. Pat. No. 6,783,736, entitled "Cartridge for analyzing a fluid sample"; Cepheid, U.S. Pat. No. 6,818,185, entitled "Cartridge for conducting a chemical reaction"; Charles River Laboratories, Inc., U.S. Pat. No. 7,329,538, entitled "Methods and compositions for the detection of microbial contaminants"; Cholestech Corporation, U.S. Pat. No. 7,220,595, entitled "Automated immunoassay cassette, apparatus and method"; City of Hope, U.S. Pat. No. 5,766,550, entitled "Disposable reagent storage and delivery cartridge"; Dade Behring Inc., U.S. Pat. No. 6,627,432, entitled "Liquid flow and control in a biological test array"; Fine, et al., U.S. Pat. No. 5,171,533, entitled "Biological assay cassette and method for making same"; Goodman et al., U.S. Pat. No. 7,326,561, entitled "Flow-thru chip cartridge, chip holder, system and method thereof"; Hewlett Packard Development Company, L.P., U.S. Pat. No. 6,702,894, entitled "Fluid ejection cartridge and system for dispensing a bioactive substance"; Instrumentation Laboratory, Inc., U.S. Pat. No. 4,458,812, entitled "Reagent storage vessel"; International Technidyne Corporation, U.S. Pat. No. 5,504,011, entitled "Portable test apparatus and associated method of performing a blood coagulation test"; Kone Instruments Oy, U.S. Pat. No. 5,635,137, entitled "Reagent storage and reagent vessel"; Medtronic, Inc., U.S. Pat. No. 5,925,319, entitled "Test cartridge for evaluating blood platelet functionality"; Medtronic, Inc., U.S. Pat. No. 6,541,262, entitled "Method and device for testing a sample of fresh whole blood"; Medtronic, Inc., U.S. Pat. No. 6,676,902, entitled "Method and device for testing a sample of fresh whole blood"; Medtronic, Inc., U.S. Pat. No. 6,761,856, entitled "Apparatus for determining platelet inhibitor response"; Medtronic, Inc., U.S. Pat. No. 7,247,488, entitled "Method and kit for testing a multi-channel blood assay cartridge"; Medtronic, Inc., U.S. Pat. No. 7,399,637, entitled "Blood coagulation test cartridge, system, and method"; Roche Diagnostics Corporation, U.S. Pat. No. 6,448,024, entitled "Method, reagent, cartridge, and device for determining fibrinogen"; Rosetta Inpharmatics LLC, U.S. Pat. No. 7,294,478, entitled "Microarray reaction cartridge"; Sarnoff Corporation, U.S. Pat. No. 5,863,502, entitled "Parallel reaction cassette and associated devices"; Scientific Generics Limited, U.S. Pat. No. 5,116,576, entitled "Device for analytical determinations"; Thermo Biostar, Inc., U.S. Pat. No. 6,656,428, entitled "Automated point of care detection system including complete sample processing capabilities"; University of Utah Research Foundation, U.S. Pat. No. 6,242,267, entitled "Oscillation apparatus and methods for multi-analyte homogeneous fluoro-immunoassays"; University of Washington, U.S. Pat. No. 6,852,284, entitled "Liquid analysis cartridge"; the entire disclosure of each of which is incorporated herein by reference for its teachings concerning making, storing and reconstitution of dried reagents.

For examples of fluids that may be subjected to droplet operations or otherwise used to reconstitute or combine with dried or liquid reagents using the approach of the invention, see International Patent Application No. PCT/US2006/047486, entitled, "Droplet-Based Biochemistry," filed on Dec. 11, 2006. In some embodiments, the fluid includes a biological sample, such as whole blood, lymphatic fluid, serum, plasma, sweat, tear, saliva, sputum, cerebrospinal fluid, amniotic fluid, seminal fluid, vaginal excretion, serous fluid, synovial fluid, pericardial fluid, peritoneal fluid, pleural fluid, transudates, exudates, cystic fluid, bile, urine, gastric fluid, intestinal fluid, fecal samples, fluidized tissues, fluidized organisms, biological swabs and biological washes. In some embodiment, the fluid includes a reagent, such as water, deionized water, saline solutions, acidic solutions, basic solutions, detergent solutions and/or buffers. In some embodiments, the fluid includes a reagent, such as a reagent for a biochemical protocol, such as a nucleic acid amplification protocol, an affinity-based assay protocol, a sequencing protocol, and/or a protocol for analyses of biological fluids.

The techniques of the invention may include the use of one or more magnetically responsive and/or non-magnetically responsive beads. Where beads are used on a droplet actuator to deliver dried reagents in accordance with the invention, the beads may be restrained in position or otherwise removed from a droplet using magnetic fields and/or physical barriers. Examples of droplet actuator techniques for immobilizing or otherwise restraining movement of magnetic beads and/or non-magnetic beads are described in the foregoing international patent applications and in Sista, et al., U.S. Patent Application No. 60/900,653, entitled "Immobilization of Magnetically-responsive Beads During Droplet Operations," filed on Feb. 9, 2007; Sista et al., U.S. Patent Application No. 60/969,736, entitled "Droplet Actuator Assay Improvements," filed on Sep. 4, 2007; and Allen et al., U.S. Patent Application No. 60/957,717, entitled "Bead Washing Using Physical Barriers," filed on Aug. 24, 2007, the entire disclosures of which is incorporated herein by reference.

9 Concluding Remarks

The foregoing detailed description of embodiments refers to the accompanying drawings, which illustrate specific embodiments of the invention. Other embodiments having different structures and operations do not depart from the scope of the present invention. This specification is divided into sections for the convenience of the reader only. Headings should not be construed as limiting of the scope of the invention. The definitions are intended as a part of the description of the invention. It will be understood that various details of the present invention may be changed without departing from the scope of the present invention. Furthermore, the foregoing description is for the purpose of illustration only, and not for the purpose of limitation, as the present invention is defined by the claims as set forth hereinafter.

We claim:
1. A fluidic analyzer comprising:
(a) a droplet actuator comprising a substrate including a plurality of electrodes configured to actuate a droplet on a droplet operations surface;
(b) a reagent storage component in selective fluid communication with the droplet actuator and comprising:
  (i) a reservoir comprising an aqueous solvent;
  (ii) an aqueously soluble dry reagent configured to combine with the aqueous solvent to yield a reconstituted reagent droplet;
  (iii) an outlet providing fluid communication from the reservoir to the substrate; and

(iv) a removable or breakable seal preventing the aqueously soluble dry reagent from contacting the aqueous solvent.

2. The fluidic analyzer of claim 1 wherein the reagent storage component comprises the reagent in a vacuum.

3. The fluidic analyzer of claim 1 wherein the outlet is proximate a reservoir electrode of the plurality of electrodes.

4. The fluidic analyzer of claim 1 wherein the reagent storage component further comprises:
(a) a channel in fluid communication with the reservoir; and
(b) a pressure source configured to communicate pressure to the reservoir via the channel.

5. The fluidic analyzer of claim 4 wherein channel is filled with a liquid.

6. The fluidic analyzer of claim 4 wherein the pressure source comprises a piston.

7. The fluidic analyzer of claim 4 wherein channel comprises at least one of a liquid and air.

8. The fluidic analyzer of claim 4 wherein the reagent storage component further comprises a plug in the fluid-filled channel wherein the plug becomes displaced when a seal between the reagent and the solvent is removed.

9. The fluidic analyzer of claim 1 wherein the reagent storage component further comprises a cover in contact with the body wherein the reagent is attached to the cover and is configured to be positioned proximate the reservoir.

10. The fluidic analyzer of claim 1 wherein the seal comprises a tab to facilitate removal.

11. The fluidic analyzer of claim 1 wherein the reagent storage component further comprises a loading fluid path configured to provide the reagent to the reagent storage component.

12. The fluidic analyzer of claim 1 wherein the reagent storage component is positioned in between the plurality of electrodes within the droplet actuator and wherein the plurality of electrodes move a droplet of the solvent into contact with the reagent.

13. The fluidic analyzer of claim 12 wherein the reagent is positioned within an electrode path of the droplet actuator.

14. The fluidic analyzer of claim 12 wherein the position of the reagent is proximate an electrode of the plurality of electrodes.

15. The fluidic analyzer of claim 12 wherein the movement facilitates the dissolution of the reagent into the droplet of solvent.

16. The fluidic analyzer of claim 12 wherein the combined solvent and reagent droplet is useful for performing an assay operation.

17. The fluidic analyzer of claim 12 wherein the reagent is associated with a magnetically responsive bead.

18. The fluidic analyzer of claim 17 wherein the droplet actuator further comprises a magnet configured to retain the bead.

19. The fluidic analyzer of claim 17 wherein the droplet actuator further comprises a physical barrier configured to retain the bead.

20. The fluidic analyzer of claim 1 wherein the plurality of electrodes comprise a plurality of fluid paths within which the reagent and another reagent of the reagent storage component are positioned such that the plurality of paths include different reagent attributes, and wherein the droplet actuator is further configured to selectively move a droplet of the solvent through a path of the plurality of paths.

21. The fluidic analyzer of claim 20 wherein the different reagent attributes are attributable to a different amount of reagent as between paths.

22. The fluidic analyzer of claim 20 wherein the different reagent attributes are attributable to the reagent and the other reagent being different types of reagents.

23. The fluidic analyzer of claim 20 wherein the different reagent attributes are attributable to a sequence in which the droplet moves between the reagent and the other reagent.

24. The fluidic analyzer of claim 1 wherein the plurality of electrodes comprise a plurality of fluid paths, and wherein the reagent storage component reagent is adhered to a substrate disposed proximate to the droplet operations surface.

25. The fluidic analyzer of claim 24 wherein the substrate disposed proximate to the droplet operations surface comprises a second reagent spaced apart from the first reagent in order to substantially correspond to a spacing of the plurality of electrodes.

26. The fluidic analyzer of claim 24 wherein the substrate disposed proximate to the droplet operations surface comprises a flexible filament.

27. The fluidic analyzer of claim 24 wherein the substrate disposed proximate to the droplet operations surface comprises marks for aligning the substrate in the droplet actuator.

28. The fluidic analyzer of claim 1 further comprising a second reagent storage component:
(a) in selective fluid communication with the droplet actuator; and
(b) comprising another reagent configured to combine with the solvent at a time of use.

29. The fluidic analyzer of claim 28 wherein the reagent and the other reagent are different.

30. The fluidic analyzer of claim 28 wherein the reagent is dried.

31. The fluidic analyzer of claim 1 further comprising a filler fluid proximate the reagent and that thickens at a temperature below an operating temperature of a droplet operation process so as to substantially retain the reagent in place until heated.

32. The fluidic analyzer of claim 1 provided in a sealed packet.

* * * * *